United States Patent
Greef et al.

(10) Patent No.: US 6,397,221 B1
(45) Date of Patent: May 28, 2002

(54) METHOD FOR CREATING AND MAINTAINING A FRAME-BASED HIERARCHICALLY ORGANIZED DATABASES WITH TABULARLY ORGANIZED DATA

(75) Inventors: Arthur R. Greef, Seattle, WA (US); Martin F. Maldonado, Kennessaw, GA (US); Steffen M. Fohn, Raleigh, NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/223,953

(22) Filed: Dec. 31, 1998

Related U.S. Application Data

(63) Continuation-in-part of application No. 09/152,186, filed on Sep. 12, 1998, now abandoned.

(51) Int. Cl.⁷ .............................................. G06F 17/30
(52) U.S. Cl. ..................... 707/102; 707/103; 707/104.1
(58) Field of Search ................................. 707/102, 103, 707/104; 705/26, 27, 79

(56) References Cited

U.S. PATENT DOCUMENTS 4,930,071 A  5/1990  Tou et al.
5,832,495 A * 11/1998  Gustman ..................... 707/102

OTHER PUBLICATIONS

A. Meier Et Al., Hierarchical to Relational Database Migratrion, IEEE Software, May 1994, pp. 21–27, vol. 11, No. 3.
D.J. Russomanno, A Knowledge–based Framework for Intelliengent Data Migration, Expert Systems: The International Journal of Knowledge Engineering, May 1996, pp. 121–132, vol. 13, No. 2.
Microsoft's How to Use Windows NT4 Workstation (year: 1996) Ziff Davis Press, Emeryville, CA by Jacquelyn Gavron and Joseph Moran, pp. A–C, pp. 27, 49, 77, 164.*

* cited by examiner

Primary Examiner—Diane D. Mizrahi
(74) Attorney, Agent, or Firm—Paul C. Scito, Esq.

(57) ABSTRACT

The method includes steps for creating and or modifying the organizational structure and data content of a frame-based, hierarchical product database with the use of tabularly arranged product data. The method features steps for enabling determination of a hierarchical database organizational structure capable of accommodating importation of tabular product data. Additionally, the method feature steps for facilitating either modification of an existing organizational structure where the database already exists, or, creation of a new frame-based, hierarchical organizational structure suitable for receiving the tabular data by generating an entirely new, original structure where none is available. In a first preferred form, the method is implemented in computer software and features program steps for enabling a database administrator, or the like, to determine what frame-based, hierarchical organizational structure would be needed to enable importation of tabular product data, the term "product" embracing both goods and or services. The method features steps for displaying to the database administrator the tabularly organized product data, and, where available, the organizational structure of an existing frame-based, hierarchical database. In a second preferred form, the method features software steps for automatically generating the required frame-based, hierarchical organizational structure where the tabular data includes the product record category and subcategory information necessary to define the organizational structure required to accommodate importation of the tabular data. Further, the method includes software steps for automatically associating the tabular product record information at the lowest level of the frame-based, organizational structure generated.

20 Claims, 18 Drawing Sheets

Product Table

| | Model Number | CPU Speed | RAM Size | Hard Drive Size | Display Type | Audio Sup. | CD ROM Sup. | Modem Sup. | Bat. Life | Net Sup. |
|---|---|---|---|---|---|---|---|---|---|---|
| 72 | DT0050 | 400 Mhz | 128 MB | 8.0 GB | CRT 19" | Yes | Yes | 56.0 KB | — | Yes |
| 74 | DT0010 | 233 Mhz | 32 MB | — | CRT 15" | — | — | — | — | Yes |
| 76 | DTH040 | 300 Mhz | 64 MB | 4.0 GB | CRT 17" | Yes | Yes | 56.0 KB | — | — |
| 78 | DTH030 | 233 Mhz | 32 MB | 2.0 GB | CRT 15" | — | — | 36.6 KB | — | — |
| 80 | LTA060 | 266 Mhz | 64 MB | 3.2 GB | LCD 13.3" | Yes | Yes | 56.0 KB | 4 Hrs | — |
| 82 | LTA020 | 233 Mhz | 16 MB | 2.1 GB | LCD 12.1" | — | — | — | 4 Hrs | — |
| 84 | PTC070 | 48 Mhz | 4 MB | — | LCD 480x240 | — | — | — | 12 Hrs | — |

Fig. 2

Enable Data Browsing

Create Or Modify
Frame And Frame Level
Organization

Product Table

| | Model Name | Class | Type | Mdl. No. | Body Color | Flash | Rewind | Lens | Res. | LCD Size |
|---|---|---|---|---|---|---|---|---|---|---|
| 422 | Quick A21 | Camera | Point & Shoot | 530 | Blue | Built-in | — | — | — | — |
| 424 | Easy Z25 | Camera | Point & Shoot | 856 | Green | Removable | — | — | — | — |
| 426 | Pro H15 | Camera | SLR | 478 | Black | — | Auto | Zoom | — | — |
| 428 | Cobra | Camera | SLR | 123 | Grey | — | Manual | Tele-photo | — | — |
| 430 | Image | Camera | Digital | 765 | Grey | — | — | — | 600 dpi | 3x5 |
| 432 | Picture II | Camera | Digital | 279 | Silver | — | — | — | 300 dpi | 2x2 |

Fig. 17

METHOD FOR CREATING AND MAINTAINING A FRAME-BASED HIERARCHICALLY ORGANIZED DATABASES WITH TABULARLY ORGANIZED DATA

RELATED APPLICATIONS

This application is a continuation in part of application Ser. No. 09/152,186, filed Sep. 12,1998 now abandoned.

BACKGROUND OF THE INVENTION

1. Field of Use

This invention relates generally to the creation and maintenance; i.e., management, of frame-based, hierarchically organized databases, as for example, those used for providing interactive product data to prospective purchasers; and more particularly, to a method preferably implemented in computer software for the creation and maintenance; i.e., management, of frame-based, hierarchically organized databases containing product data with the use of tabularly organized product data, the method featuring steps for displaying tabularly organized data and, when available, a hierarchical data organizational structure to the software user who compares the organization of the tabular data and data values to a desired or available frame-based, hierarchical database organizational structure and, thereafter, enters information to facilitate creation or, when available, maintenance of the frame-based, hierarchical database structure and infusion of the tabular data into the database; further, in the case where the frame-based, hierarchical data organizational structure can be inferred from the tabular data, the method includes steps for automatically merging the tabular product data into the hierarchical database without user intervention; and still further, this method, where the frame based hierarchical data organizational structure can be inferred from the tabular data, is implemented in a computer software program using the JAVA computer programming language.

2. Related Art

Continuing advances in personal computing and the explosive growth of the Internet and its World Wide Web, have combined to produce tremendous opportunity for buying and selling just about any kind of product or service, from just about anyplace in the world where an Internet connection can be made. Generally referred to as "Electronic Commerce" or "E-Commerce" for short, this new frontier is revolutionizing the way people for centuries have bought and sold things. With E-Commerce, instead of prospective purchasers; i.e., shoppers, having physically to go out to actual stores, malls or other points of distribution to search for the things desired, they, instead, can simply fire up their respective personal computers, access the Internet's World Wide Web and browse cyberspace for virtual points of sale at which everything from Automobiles to Zoot Suits can be found—a true cornucopia of whatever there is to be had—anywhere. Gone too, generally, are the problems of commuting, crowds, long lines and empty shelves. Instead, if the items sought can be downloaded; e.g., information, books, software, music, videos, and the like, they can be immediately had on payment of the required purchase price. Or, if the thing desired is tangible; e.g., from fruit baskets to refrigerators, it can be ordered for delivery from the manufacturer or distributor.

However, while this advance in commercial enterprise, provides a plethora of shopping possibilities, it also presents a number of new and perplexing problems. One that is particularly difficult is the problem of providing systems for browsing and effectively presenting the many and varied things that can be found and purchased in cyberspace.

As those familiar with the technology are aware, Web site sales facility are commonly fashioned around some form of computer-based catalog, which is itself built upon a product database containing records concerning the items being offered. And, as will be appreciated by those skilled in the art, though the term "product" is used here and elsewhere in this disclosure, the term should be understood to include both goods and services, and indeed, anything that might be offered for sale.

In that regard, workers have found that the ability to satisfy a shoppers search expectations are dependent upon how the product data is organized; i.e., what type of product data is included, how much of it is present and how quickly it can be reviewed. As many Web shoppers have regrettably found, at some sites, they may have to plow through mounds of product information to find, if at all, the item they're looking for, and that can be a toilsome and perplexing task. Additionally, the job can be made yet the more frustrating where one is unsure of exactly what one is looking for, and as a result be unable to successfully navigate through the information provided to find the kind of thing desired, or be unable to effectively compare what is found with alternatives when something of interest is located to assure that what has been found would be a wise choice.

More specifically, experience has shown that where a product database is structured in relational form, i.e., tabularly, with rows of product names associated with columns of product features, or vice versa, shoppers can encounter difficulty. While it is common to find product databases organized in relational form; relational form being favored by manufactures and providers for its simplicity, and favored by distributors and suppliers for the abundance and typically low cost of relation database software, shoppers, on the other hand, unfortunately, find relational databases difficult and frustrating to select products from. In relational form, and as noted, the product data is tabularly arranged. Typically, product names, model numbers or other form of designators are disposed, in rows as record identifiers, followed by columns of product features; i.e., product attributes, which define the product, or vice versa, i.e., columns of product names and rows of attributes. As will be appreciated, to access a product record, commonly, either the user has to designate a product name, model number, or enter a descriptive, product-feature word strings to locate the product desired. However, such record access procedures are difficult for shoppers who don't know what model names or numbers to ask for, or who don't understand what features will be appropriate to put in a string search, or indeed, who don't really know what they are exactly looking for, And, as might be expected, this problem becomes even more difficult where the shopper spectrum includes individuals having different levels of product awareness, and diverse ages, educational, and community backgrounds. As will be appreciated, the less sophisticated the shoppers, the more difficult it is for them to appreciate the search process, understand product jargon, and discriminate between product features.

As an alternative to relational databases, however, it has been found that even shoppers having different product familiarity and backgrounds are commonly able to easily and quickly extract desired product information from database that are hierarchically arranged and presented. As an illustration, where a shopper is looking for specialty apples; for example, from a gourmet site, he can more readily make progress with his selection if he looks first at foods, then fruits, and then apples as he progress to his selection. At the least, the approach of moving from generally understood category to subcategory and sub-subcategory avoids the risk of causing the uninitiated shopper to mistakenly compare apples and oranges when trying to make his purchase selection.

However, because, product data as noted, is usually found in relational rather than hierarchical form, difficult can be encountered in economically building and maintaining hierarchically organized product databases. Where hierarchical product data is limited, labor-intensive, and accordingly, expensive efforts may have to be undertaken to develop sufficient hierarchical product data to create and maintain the site database in hierarchical form. Again as noted, manufacturers, the primary source of product data, prefer relational; i.e., tabular, data format because of its simplicity. Additionally, manufactures may not be able to anticipate, or indeed, not care how there products will be hierarchically arranged for purposes of comparison. Further, in other cases, manufacturers may wish to frustrate hierarchical comparison so their products will have a better chance of selling than they might otherwise have if prospective purchasers were able to easily and quickly categorize alternative choice.

Additionally, and as a further problem, hierarchical product organizations tend to be specific to the sales application they are used with. As a result, the hierarchical product data may have to be specifically tailored to the particular application it is intended for. Accordingly, depending on the nature and intent of a hierarchical product database, it may not be possible to easily and repeatably incorporate tabular; i.e., relational data, into the hierarchical database organization.

While some workers in the field of database design have suggested methods for "coupling" relational and hierarchical databases so that queries put to the hierarchical database may be transferred through for processing at the relational database, and information derived from the query transferred back to the hierarchical database, thus avoiding or at last reducing the need for hierarchically organized product data, the suggestion of maintaining two forms of database in a single system is cumbersome and difficult to manage and operate. For example, in U.S. Pat. 4,930,071 issued May 20, 1990, Tou et al. disclose a method for mapping between a relational database and a knowledge database of an "expert system" organized in hierarchical form. In this arrangement, queries put to the knowledge database can be mapped through to the relation database where the query can be processed and inferences derived returned to the knowledge database where the query results can be mapped into the knowledge database for subsequent use. However, as shown in FIGS. 1, 10–18, of the Tou et al. patent and as described in the accompanying specification, the system requires extensive translation and mapping functions to pass queries to the relation database and back to the hierarchical knowledge database where they can be subsequently used in formulating subsequent responses to the queries. As a result, the Tou et al. proposed system would not be commercially attractive for use with the personal computers and server systems commonly found on the World Wide Web of the Internet.

SUMMARY OF THE INVENTION

Accordingly, it is an object of the present invention to provide a method for generating and maintaining; i.e., managing, a frame-based, hierarchical organizational structure used in creating and maintaining a, frame-based, hierarchical product database.

Additionally, it is an object of the present invention to provide a method for generating and maintaining frame-based, hierarchical product data used in creating and maintaining the frame-based, hierarchical product database.

Yet further, it is an object of the present invention to provide a method for generating and maintaining the frame-based, hierarchical database organizational structure from tabularly arranged product data.

Still further, it is an object of the present invention to provide a method for generating and maintaining the frame-based, hierarchical product data from tabularly arranged product data.

Additionally, it is an object of the present invention to provide a method for generating and maintaining the frame-based, hierarchical database from tabularly arranged product data which is simple and easy to use.

Still additionally, it is an object of the present invention to provide a method for generating and maintaining the frame-based, hierarchical database which a user can interactively control.

Yet additionally, it is also an object of the present invention to provide a method for generating and maintaining the frame-based, hierarchical database from tabularly arranged product data, that can be automatically carried out where the tabular data includes adequate frame-based, hierarchical information.

Still further, it is an object of the present invention to provide implementations of the invention as computer software programs for generating frame-based, hierarchical databases from tabular arranged product data conforming to generic relational database formats.

Briefly, to achieve the above and other objects and advantages, the method of the present invention includes steps for creating and or modifying; i.e., managing, the organizational structure and data content of a frame-based, hierarchical product database with the use of tabularly arranged product data. More specifically, the method features steps for enabling determination of a hierarchical database organizational structure capable of accommodating importation of tabular product data. Additionally, the method features for facilitating either modification, i.e., change of, an existing frame-based, hierarchical database organizational structure where the database already exists, to enable, where required, reorganization of the database structure and importation of the new, tabular data so as to maintain the database; or, creation of a new frame-based, hierarchical organizational structure suitable for receiving the tabular data by either generating an entirely new, original structure where none is available; i.e., exists, or modifying a suitable organizational structure of a database which exists, but which is not to be maintained.

In a first preferred form, the method is implemented in computer software and features program steps for enabling a database administrator, or the like, to determine what frame-based, hierarchical organizational structure would be needed to enable importation of tabular product data, the term "product" embracing both goods and or services. More particularly, the method features steps for displaying to the database administrator the tabularly organized product data, and, where available, the organizational structure of an existing frame-based, hierarchical database. Additionally, the method features steps for enabling the administrator to interactively browse and analyze the displayed tabular product data, and compare the tabular data with the organizational structure of, frame-based, hierarchical database, where a frame-based, hierarchical database is available, i.e., already exists.

In the case where a database having frame-based, hierarchical, organizational structure is available and is to be maintained, the method features software steps for enabling the administrator to identify modifications to the organizational structure in the form of changes to the frame attributes, attribute values, frames and frame levels necessary to accommodate importation of the tabular data to the database. Thereafter, if required, the existing frame-based, hierarchical data can be reorganized in accordance with the modified database structure, and the new, tabular data imported for inclusion therewith so as to maintain the database.

On the other hand, where a new database having a frame-based hierarchical organizational structure is to be created, the method further features steps for enabling the administrator to originally create an organizational structure including, frame-based, hierarchical levels; i.e., levels having parent-child relationships such as category-subcategory, and one or more frames associated by those relationships within each level, the frames including product attributes and product attribute values; i.e., features and feature values, for defining and distinguishing one type of product from another. Further, in the case where a new organizational structure is to be created, but, where a suitable organizational structure is available from a database which is not to be maintained, that structure may be used as the basis for the new structure, and suitably modifications made in the fashion noted to achieve the structure to be created.

Yet additionally, the method includes software steps for subsequently promoting frame attributes to the highest common level in the hierarchy. Further, in preferred form, the method, still further, includes steps for mapping the tabular product attributes to the hierarchical organizational structure product frame attributes, and steps for designating a tabular attribute as a tabular record identifier, and mapping of the imported tabular product data to the hierarchical product database once the modified hierarchical, organization has been defined. And, following creation of the structure, the method features steps for merging the tabular data to the frame-based hierarchical structure created to form the database.

In a second preferred form, the method features software steps for automatically generating the required frame-based, hierarchical organizational structure where the tabular data includes the product record category and subcategory information necessary to define the organizational structure required to accommodate importation of the tabular data and names for frame that avoid naming ambiguities in the hierarchical organizational structure. Further, the method includes software steps for automatically associating the tabular product record information at the lowest level of the frame-based, organizational structure generated. Yet additionally, the method includes steps for automatically promoting record attributes to the highest common level in the frame-based hierarchy. Further, the second preferred form of the invention is implemented in a computer software program using the JAVA computer programming language.

DESCRIPTION OF THE DRAWINGS

The above and further objects, features and advantages of the invention will become apparent from the following more detailed description when read with reference to the accompanying drawings in which:

FIG. 2 is a diagram illustrating tabularly organized product data for the respective computer systems illustrated in FIG. 1, the tabular product data being suitable for use in accordance with the method of the present invention in a first preferred form;

FIG. 17 is a diagram illustrating tabularly organized product data suitable for use with the method of the present invention in a second preferred form.

DESCRIPTION OF THE PREFERRED EMBODIMENT

Figure 1:
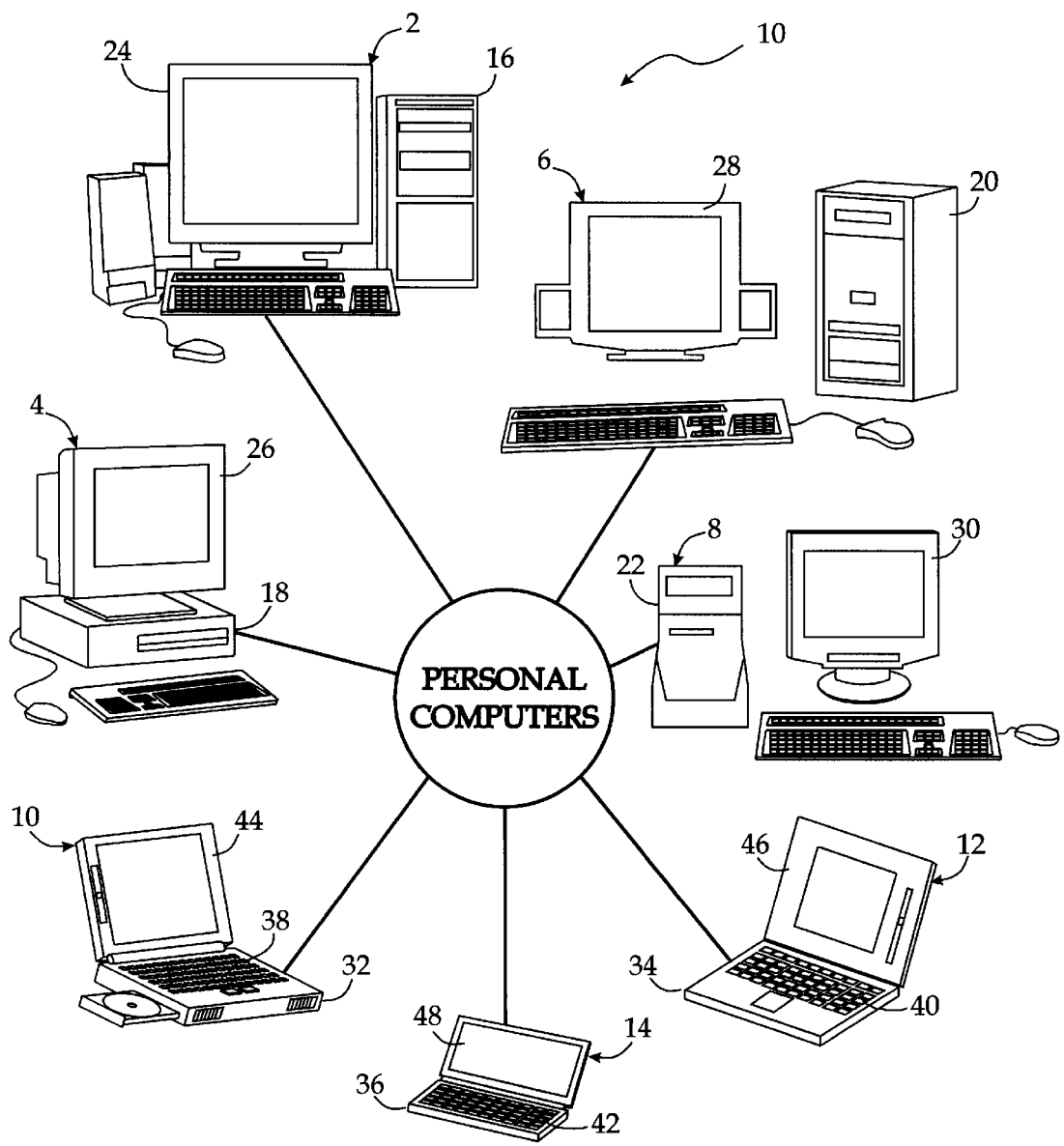
FIG. 1 is a diagram illustrating a variety of computer system products suitable for inclusion in a frame-based, hierarchical database created or maintained in accordance with the method of the present invention.

As noted, the monumental growth of the Internet and its World Wide Web has created a watershed in opportunity for electronic commerce. However, while these historic advances in computer technology and commercial enterprise have presented a wealth of new possibilities for the age-old process of buying and selling, they have also presented a number of new and perplexing problems. One that is particularly difficult is the problem of providing systems for browsing and effectively presenting the many and varied things that can be found and purchased on the Web.

As also noted, Web site sales facilities are commonly built upon computer-based catalogs, which are themselves built upon product databases containing records concerning the items being offered, the term "product" embracing goods and or services. Accordingly, before any transaction of commercial interest can occur, Web shoppers must first search through such product databases in the hope of finding something of interest. Regrettably, however, at many Web sites, shoppers have to plow through stacks of menus and product information listings to find, if at all, things they might be looking for. Additionally, if the shoppers are uncertain about exactly what they're seeking, this task can get yet more frustrating as shoppers fumble with imprecise or misdirected search terms or objectives.

As a result, shoppers have found they may be unable to successfully navigate the information provided to locate the kind of thing desired, or, if they do locate something of potential interest, they may be unable to effectively compare it with alternatives to assurance what they have located represents the "right choice" for them.

More specifically, experience has shown that where product databases are structured in relational form, i.e., tabularly, with rows of product names associated with columns of product features or vice versa, shoppers encounter difficulty. While it is common to find product databases organized in such fashion, relational form being favored by manufactures for its simplicity, and by distributors and suppliers for the abundance and typically low cost of relation database software, shoppers, on the other hand, unfortunately, find relational databases difficult and frustrating to select products from. In relational form, and as noted, the product information is tabularly arranged. Typically, product names or model numbers are disposed, in rows as record identifiers, followed by columns of product features; i.e., product attributes, which define the product, or vice versa, i.e., columns of product names and rows of attributes. Accordingly, to access a product record, the shopper has to either designate a product name, model number, or enter a product-feature word strings to locate the product desired. However, such procedures are difficult for shoppers who don't know what model names or numbers to ask for, or who don't understand what features will be appropriate to put in a string search, or indeed, who don't know exactly what they are looking for. And, this problem becomes even more difficult where the shopper spectrum includes individuals having different levels of product awareness, and diverse ages, educational, and community backgrounds.

However, as an alternative to relational databases, it has been found that even shoppers having elementary product familiarity and backgrounds are commonly able to easily and quickly extract desired product data from databases that are arranged and presented in a frame-based, hierarchical systems, the frame-based, hierarchical systems including multiple, hierarchical levels having relationships such as category-subcategory, and one or more frames associated by those relationships within each level, the frames including product attributes and attribute values; i.e., features and feature values, for defining and distinguishing one type of product from another.

However, as noted, because, product information is usually found in relational rather than hierarchical form, difficulty can be encountered in economically building and maintaining hierarchically organized product databases. Where hierarchical product information is limited, labor-intensive, and accordingly, expensive efforts may have to be undertaken to develop sufficient hierarchical product data to create and maintain the site database in frame-based, hierarchical form. Additionally, manufacturers, the primary source of product data, prefer a relational; i.e., tabular, data format because of its simplicity. In some cases, manufactures may be unable to anticipate, or not care how there products will be hierarchically arranged for purposes of comparison. And, in other cases, manufacturers may wish to frustrate hierarchical comparison so their products will have a better chance of selling than they might otherwise have if prospective purchasers were able to easily categorize alternative products.

Additionally, and as a further problem, hierarchical product organizations tend to be specific to the sales application they are used with. As a result, the hierarchical product information may have to be specifically tailored to the particular application it is intended for. Accordingly, depending on the nature and intent of a hierarchical product database, it may not be possible to easily and repeatably incorporate tabular; i.e., relational data, into the hierarchical database organization.

While as also noted, workers in the field; for example, Tou et al. in U.S. Pat. No. 4,930,071, have proposed computerized systems for "coupling" a knowledge base (hierarchical database) to relational data, because their approach seeks to retain the original organizational structure of the hierarchical database, and manipulate the relational data to accommodate the hierarchical structure, their system is complicated and elaborate, rendering it commercially unattractive.

The method of the present invention, on the other hand, provides a simpler and more convenient approach to the problem of using relational data in a hierarchical organizational framework. In its broad aspects, the method of the present invention, rather than seeking to maintain the hierarchical organizational structure of the existing database, instead, seeks to adapt; i.e., modify, the hierarchical database organizational structure so as to accommodate the relational; i.e., tabular, data, then, if required, reload the existing hierarchical data to the modified organizational structure, and, subsequently merge the new, tabular data to maintain the database. In the case where a new database is to be created, the structure may be originally formulated or derived from an existing structure and the tabular data merged to create the new database.

Further, the method of the present invention additionally simplifies the process by organizing the hierarchical database in frame-based fashion, and then utilizing manipulation of the frame attributes to conveniently map the tabular product attributes and data to the hierarchical organizational structure. As will be appreciated, this same approach works equally well where no hierarchical database exists, and, accordingly, must be originally created to accommodate the tabular data to be merged.

A better understanding of the method of the present invention and its respective preferred forms may be had with reference to the figures. More specifically, FIG. 1 illustrates a collection 10 of personal computer systems that might be incorporated into a frame-based, hierarchical database in accordance with a first preferred form of the method.

As shown in FIG. 1, personal computer collection 10 includes a range of systems that upon being seen, would be generally distinguishable by members of the public having even limited understanding of the technology. The information conveyed by the appearance of the respective units, and general understanding of the average shopper alone would suggest which systems are generally alike, which are generally different, and which might be more suited to a particular purpose than others.

For example, if a shopper were looking for a computer for a new, small business, upon seeing the collection presented in FIG. 1, he would likely be able to discern which might be suitable for the desk of his new office, and which not.

Specifically, systems 2 to 8 shown at the upper portion of FIG. 1, based on their respective sizes and configurations would appear intended to be stationary; e.g., on a desktop. The structure of the housings; i.e., "box", for the computer central processing unit (cpu), respectively, 16, 18, 20, 22, and the bases of the associated displays, respectively 20 24, 26, 28, 30, suggest to even the uneducated eye that the respective systems are of a size, weight, and form factor suited for use with a desk; e.g., on or under, and accordingly, the tasks that might be expected to be associated with such a location.

On the other hand, systems 10, 12 and 14 shown at the lower portion of FIG. 1 have evident sizes and configurations intended to be mobile; i.e., portable. Plainly, cpu cases 32, 34, and 36 having respective, integrated keyboards 38, 40, 42 and displays 44, 46, 48 and associated components within their case that are designed to be hand carried from place to place, and accordingly, suitable for the tasks that might be associated with such use.

Still further, if the shoppers were more knowledgeable, they might appreciate that in view of the large screen, large audio speakers and "tower" configuration of the cpu box of system 2 shown in FIG. 1, that system 2 is likely a "high end" unit such as a workstation suitable for comprehensive business applications. And, system 4, in view of its smaller screen, thin desktop cpu box and no audio system, might appear to the knowledgeable eye to be a terminal unit suitable for a business network supported by a central server and information base. Additionally, in view of the moderate screen, audio speakers and cpu box that system 6 is seen to have, knowledgeable shoppers might recognize it as fully configured, multimedia home or small business unit, suitable for handling the associated application of such systems. And, in view of the modest cpu box, small screen and absent speakers of system 8, aware shoppers might recognize system 8 as a low-end, home unit, suitable for entry-level applications and budgets.

Comparably, knowledgeable shoppers might also be able to deduce from inspection the character and mission of portable systems 10, 12 and 14. Particulary, the large screen, thick case, CD ROM reader and integrated audio speakers of system 10 might suggest to familiar shoppers a multimedia laptop, potentially as powerful, and in some cases more so, than most desktop systems, and, accordingly, suitable for substantially all business and personal computing needs. Further, and on the other hand, system 12 with its smaller screen, thinner case and absence of CD-Rom and audio speaker might suggest to the aware shopper an entry-level laptop suitable for most personal and a number of business computing needs. Finally, the reduced-size case, screen and keyboard of system 14 suggests a palmtop unit featuring enhances mobility and simplicity at the price of reduces functional capability.

Accordingly, it is apparent that where shoppers are able to physically inspect and compare items being considered for purchase, depending on their level of familiarity with the subject matter, they, at least, may be able to make some quick, broad judgements about what might be suitable and which might not be suitable for their purpose. Further, if armed with a bit more knowledge, or provided some assistance, the shoppers might be able to go directly to the product best suited to their needs and tastes.

However, and as noted, in the case of Web commerce, shoppers, typically, do not have the luxury of an "at once"; i.e., immediate, actual physical inspection, or even an immediate, graphical representation. Indeed, in cyberspace, the shopper, as noted, may have to first wade through a labyrinth of menu and or search display screens before anything of product-descriptive substance is seen. And accordingly, the shopping experience is made the more difficult. Rather, because of limitations in communication line speed, display capability and production cost, E-Commerce presentations; e.g., E-Commerce catalogues, commonly found on the Web, typically, do not include the extensive or immediate use of initial product visuals or visual groupings as might be available in an actual store show room. The reasons are obvious. It is difficult at best for a Web-site provider to anticipate what shoppers visiting a site may be looking for. Accordingly, its is problematic to know what would be best to show first from the wide range of goods and or service offerings commonly available at a Web E-Commerce site, that breath, in fact, being one of the attractions of a Web site. In this regard, the first display; i.e., home page, of a Web site or E-Commerce catalog is like the cover of a print catalog. Additionally, because the first few seconds of shoppers' arrival at a Web site are critical to capturing and retaining shopper interest, if presentation of the display is slow, or labored, as for example where extensive graphics are sought to be presented, shoppers may become impatient and surf away to another Web site.

Further, nor, for that matter, is the assistance of a sales person available to greet the shoppers as they arrive and guide them through the "store." Instead, because of technical considerations associated with communication line speed, (bandwidth), the amount of information that can be put on a display screen, and production costs, E-Commerce shoppers are more likely to be presented as noted with a sequence of welcoming and introductory screen displays followed by product information in tabular text form, which, if shoppers are lucky, might be collected in a fashion suitable for immediate comparison, or, if not so lucky, requiring further subject-matter searching for collection and organization before comparison is possible.

In that regard, FIG. 2 illustrates the kind of product table 50 that might be presented following some initial orientation screens at a basic E-Commerce Web site in response a shoppers request for information concerning the purchase of personal computer to be used in a small business. And, for purpose of illustration, the table has been composed to include the computer systems illustrated in FIG. 1.

With regard to FIG. 2, table 50 is seen to include a number of rows 72 to 84 and a number of columns 52 to 70 for presenting records of products having specific features. In the form of the table shown, product records are arranged as rows, one row per product, and have product attributes; i.e., features, arranged as columns, one column per attribute. Further, as in common tabular form, the intersections of rows and columns define cells containing the particular attribute values for the respective product records. As would be appreciated, the mode of presentation could be readily interchanged; i.e., if for any reason it was deemed appropriate, product records could be presented as columns, and product attributes as rows. However, because the number of records are potentially greater than product attributes, records have been designated as rows which might be continued from page to page, as needed, and the finite set of attributes presented as columns over the limited width of the needed pages.

With respect to table 50, and again for purposes of illustration, product records are presented at rows 72 to 84 and, again for purposes of illustration, include records representing the computer systems shown in FIG. 1. Particularly, the record for workstation 2 is presented at first row 72; the business network unit 4 at row 74; multimedia home unit 6 at row 76; entry-level home unit 8 at row 78; multimedia laptop at row 82; entry-level laptop 12 at row 82; and palmtop unit 14 at row 84. Additionally, the product attributes for the records are presented at columns 52 to 70, and are seen to include: model number at column 52; cpu speed, at column 54; ram size, at column 56; hard drive size at column 58; display type at column 60; audio facility at column 62; cd rom facility at column 64; modem facility at column 66; battery life at column 68; and network support at column 70.

As is immediately apparent, though data may be found in table 50 for reaching the same kinds of system type and character appraisals that follow directly from visual inspection of the units shown in FIG. 1, those appraisals are not so readily derived when tabularly presented data has to be used. As experience has shown, use of tabular product data typically requires either reference to personal knowledge that facilitates integration of tabular product data to a visual reality the user is familiar with, or, additional classification information; e.g., hierarchical category, subcategory information, that organizes the tabular product data into a framework the user can understand.

On the other hand, experience has also shown, that while tabularly presented product data is typically difficult to visualize and put in comparative context, hierarchically organized data and, particularly frame-based, hierarchical organized data featuring representations of product categories and products as a hierarchy of frames having frame attributes and attribute values, provides a representation of associations that enable shoppers to more readily understand and appreciate products and their relationships to each other.

Figure 3:
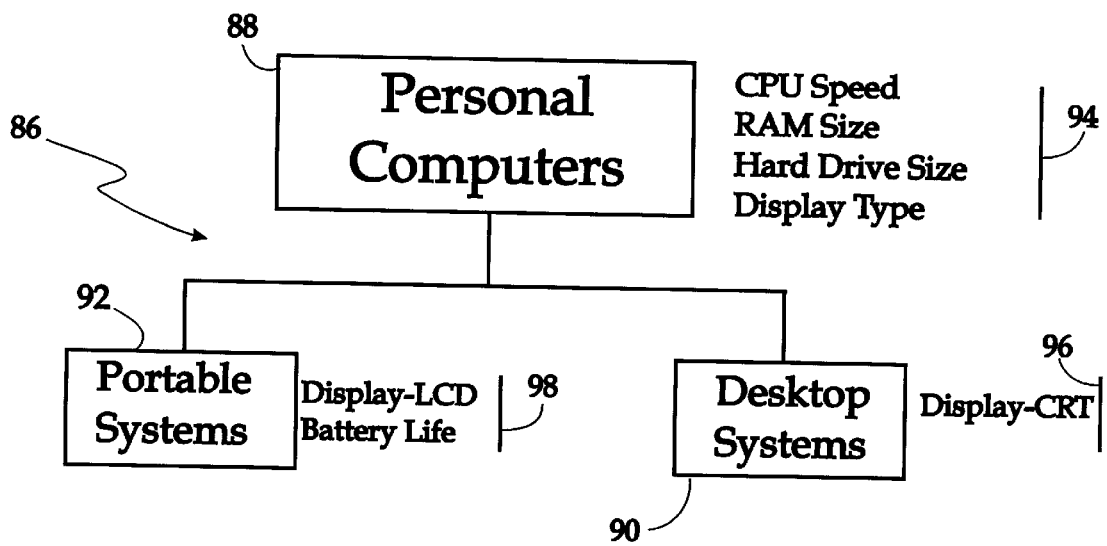
FIG. 3. is a block diagram illustrating a frame-based, hierarchical organizational structure suitable for a computer system database created or maintained in accordance with the method of the present invention in a first preferred form.

Once again, this observation is made apparent with reference to the figures. Particulary, FIG. 3 provides an illustration of the a frame-based, hierarchical organization 86 that would have relevance, although incompletely, to the collection of personal computer systems pictorially presented in FIG. 1, and tabularly presented in FIG. 2. Particularly, frame-based, hierarchical organization 86 feature a top level frame 88 for the category of personal computers, and two subcategory frames 90, 92 for, respectively, desktop systems and portable systems.

As shown in FIG. 3, frame-based, hierarchical organization 86 is also seen to include frame attributes and attribute values which are ascribed to the respective frames to further identify the nature of each frame and its relationships to the other frames. Particularly, in accordance with association rules commonly applied to hierarchical organizations, attributes appearing at a particular frame level in the hierarchy, apply to all depending frames of lower hierarchical level. Further, within a level, frames may be given different attributes and or different attribute values to, thereby, identify different product types within the category level.

More specifically, Personal Computers frame 88 includes a set of attributes 94, which are common to all personal computers in the organization since the attributes are associated with the highest frame in the hierarchy, and for the organization shown, include the product attributes of CPU Speed (CPU), Ram Size (RAM), Display Type (Display), and Hard Drive Size (Hard Drive). Still further, Desktop Systems frame 90 and Portables Systems frame 92, respectively, further have attribute sets 96 and 98, respectively, which include, in addition to the attributes of the frame from which they depend; i.e., frame 88 and set 94, the attributes and attribute values that distinguish their respective frames. Particularly, the frame attribute Display is seen associated with frames 90 and 92, and, respectively, has the values of CRT (Cathode Ray Tube) at Desktop Systems frame 92, and LCD (Liquid Crystal Display) at Portable Systems frame 92. Yet additionally, portable systems attribute set 98 is seen to include the attribute Battery Life, which is not found associated with Desktop Systems frame 90 for desktop systems. Accordingly, the product features that distinguishes portable systems from desktop systems are: the kind of display types commonly associated with each; i.e., CRTs and LCDs, respectively, and the use of batteries; i.e., Battery Life attribute, associated with portable computer systems. While it is to be appreciated that other product attribute or attribute values might be suitable for use in distinguishing between desktop systems and portable systems, organization 86 depicted in FIG. 3 has elected the noted attributes and attribute values to define the distinction between the two types of personal computer systems.

Figure 6:
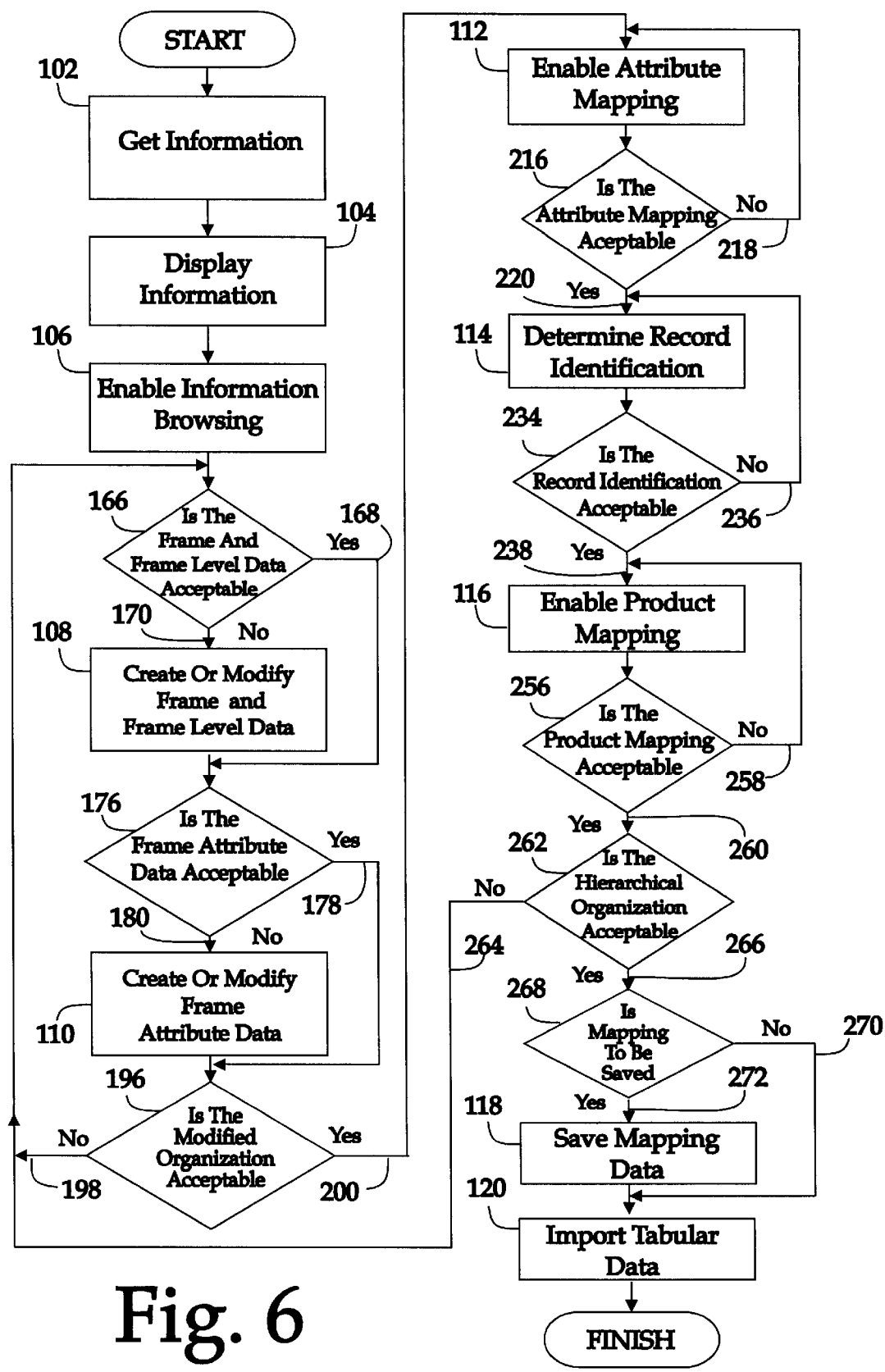
FIG. 6 is a flow diagram illustrating the general steps of a first preferred form of the method in accordance with the present invention.

Accordingly, since frame-based, hierarchical presentation is more user recognizable than tabular format, frame-based, hierarchical organization has been made a principal aspect of the method in accordance with the invention However, it is also clear from FIG. 3 that organizational structure 86 though of potential advantage, is not adequate in its present form to accept all of the potential frame levels, frames, product attributes and attributes value included in table 50. Accordingly, it is a further aspect of the method of the present invention to provide method steps for rendering the product data of table 50 includable in frame-based, hierarchical form. And, in view of the efficiency of computerized handling of data, it is yet another aspect of the invention to preferably implement that method as software steps in a computer program. More specifically, FIG. 6 presents a flow diagram that illustrates the general steps of a software-based, first preferred form of the method 100 in accordance with the invention. In its first form, the method includes a sequence of program steps for enabling a user; e.g., a system or database administrator, to import tabular product data of the kind shown in FIG. 2, into either an existing frame-based, hierarchical database organizational structure; e.g., as shown in FIG. 3, or to create a suitable, new organizational structure for receiving such tabular data where no adaptable database; i.e., adaptable organizational structure, exists.

As seen in FIG. 6, in preferred form, the method includes a sequence of general steps depicted as enumerated blocks 102 to 120 for importing the tabular data. As will be appreciated, each general step is itself composed of one or more specific steps more fully described in FIGS. 7 to 16, to be explained below.

Particularly, and with respect to FIG. 6, the first form of the method includes general step 102 for retrieving the initial information; i.e.,the tabular data to be imported, and, where it is available; i.e., exits, the frame-based, hierarchical organizational data that will be adapted to receive the tabular data; step 104 for displaying to the user the information to be retrieved; step 106 for enabling the user to browse the information retrieved; step 108 for enabling the user to modify or create; i.e., fashion, the hierarchical frames and frame levels needed to import the tabular data; steps 110 for enabling the user to modify or create; i.e., fashion, the hierarchical frame attributes and attribute values needed to import the tabular data; step 112 for enabling the user to map the tabular product attributes to the fashioned hierarchical frame attributes; step 114 for enabling the user to designate tabular record identifiers; step 116 for enabling the user to map the tabular records to the fashioned, hierarchical frame attributes; step 118 for enabling the user to save the mapped attributes for some future purpose; e.g., loading additional tabular data; and step 120 for importing the new tabular data.

With regard to existing, hierarchical product data, in the case where an existing database is to be maintained, if the original product data of the database is to be retained, it would be reloaded to the modified organizational structure with the tabular data when the tabular data is imported. However, where the existing database is to be maintained, but, the desire is not to retain the original hierarchical product data, the original data would not be reloaded.

Further, in the case where a new database is to be created, and a new organizational structure formulated, where the structure is entirely, newly formulated, there would be, accordingly, no existing, hierarchical product data to reload. And, again, where a new database is to be created, but, where an existing database is found to have a structure suitable for being adapted to form the new database structure, and where, the resulting, modified organizational structure is retained under the new database name, the previously existing hierarchical product data, would not be reloaded, the existing database remaining undisturbed.

As is also apparent from FIG. 6, the first form of the method includes "conditional" program steps between certain of the general steps, at which the method prompts the user; for example, advance the method, or, go back and repeat a general step, as in the case where it may be necessary to make corrections, change results, etc.; or, to skip steps that may be inapplicable; or, to elect an action such as saving mapping information, etc. or not. As will be appreciated, while such steps are preferred, they are optional, the method being capable of operation without them.

As noted, general method steps 102 to 120 are themselves comprised of one or more specific steps shown in further detail in FIGS. 7 to 16. For purposes of illustration, and for ease of description, FIGS. 7 to 16 will be described for the case where an existing database is to be maintained, and where the user has designated the hierarchical organizational structure of the existing database as the structure which is to be remodeled in accordance with the method to generate a modified organizational structure suitable for accommodating importation of the tabular data designated to maintain the database. As such, the organizational structure of the existing database constitutes the starting point for the method.

However, it should be also understood that if instead of maintaining an existing database, the objective were to create a new one, and if no hierarchical organizational structure suitable for being adapted were available, the description given below would be adjusted to note creation of the elements necessary for a new, frame-based, hierarchical organizational structure appropriate for the new database. On the other hand, if a suitable structure for forming the basis of a new database existed and was available, the following description would be modified to include reference to changes of that existing structure in creating the new database.

Continuing, as explained, in preferred form, the method of the invention is implemented as a computer program. Accordingly, the user would access the method as embodied in the program with a conventional computer having a monitor at which the program would generate screen displays that the user would interact with in carrying out the method. Particularly, and with reference to FIGS., 6, first step 102 of the method; i.e., Get Information, is seen to immediately follow start of the method; e.g., after the user activates the program embodying the method. Further, as shown in more detail in FIG. 7, Get Information step 102, itself, includes an initial step 122, at which the method asks; i.e., prompts, the user to identify the source of the tabular data, and the source of any frame-based, hierarchical organizational data to be employed as the starting point for the organizational structure that will be fashioned to accommodate the tabular data to be imported. In this regard, the user would supply respective computer file names and file locations; i.e., paths, so that the program embodying the method could retrieve the identified data. However, as would also be appreciated, the information could alternatively be supplied in any other convenient fashion; e.g., entered manually; supplied by another program, or, supplied over a network, either local or wide area.

Figure 7:
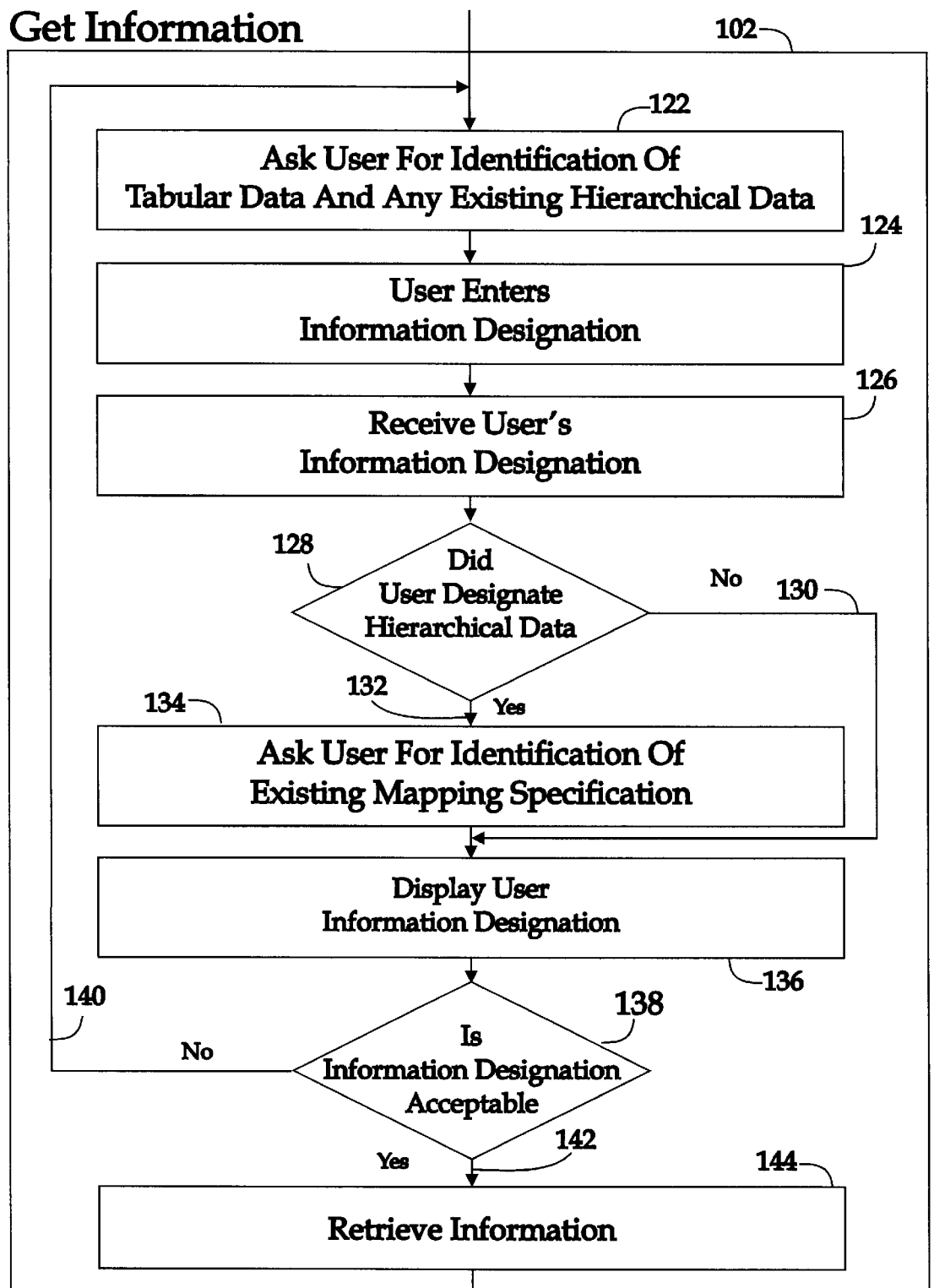
FIG. 7 is a flow diagram illustrating the more specific steps associated with the "Get Information" general step for the first preferred form of the method in accordance with the invention illustrated in FIG. 6.

As shown in FIG. 7, following, the program's prompt of the user for identification of data at step 122, the method includes a step 124, for enabling the user to enter his designation of data. This, again, might be done in any convenient fashion; e.g., at an interactive display field, or selection from a file listing or menu, etc. Thereafter, the program receives the user's response at step 126 as shown.

Continuing, following receipt of the data designation, the method includes conditional step 128 to expedite processing. Specifically, in the case where the user has designated hierarchical organization data; i.e., satisfied the noted condition, the program continues at branch 132 by advancing program flow to step 134 where the method prompts the user to enter identification of any existing mapping specification for the hierarchical data. In the alternative, where the user has not specified any hierarchical data; i.e., not satisfied the condition, the program proceeds over branch 130, and bypasses mapping specification prompt step 134, and advances directly to display step 136 where the user's entries are presented for confirmation.

In association with display of the user-designated information at step 124, the method also enables the user to decide whether the entries made are acceptable or, whether because of error or desire for an alternate choice, they are not. Particularly, the method includes conditional step 138 following step 136, conditional step 138 providing alternative processing branch paths 140 and 142. In the case where the data designations are not acceptable, the user can elect to return to prompt step 122, over branch 140 where the method will again allow the use to designate the tabular and hierarchical data to be operated on. Alternatively, if the user finds the designations satisfactory, he can indicate so, and the method will enable program flow to advance over branch 142 to step 144, where the program will retrieve the information designated at step 124 to complete Get Information step 102. Consistent with earlier remarks concerning conditional steps, it should be understood return step 138 is optional.

In preferred form, the method would additionally include procedures at step 144 to handle possible inability to retrieve the data designated; e.g., an error message and a retry-or-abort routine. However, for the sake of simplicity, such steps have neither been shown nor described, it being assumed for the purposes of description that all processing steps successfully execute unless otherwise noted. In that regard, and again for simplicity of discussion, like assumption of successful processing are also to be made for all other program steps unless otherwise noted, and, similarly, no mention of error messages and retry-and-abort routines have been made for such other steps, though, in preferred form, the method would be understood to include them.

Figure 8:
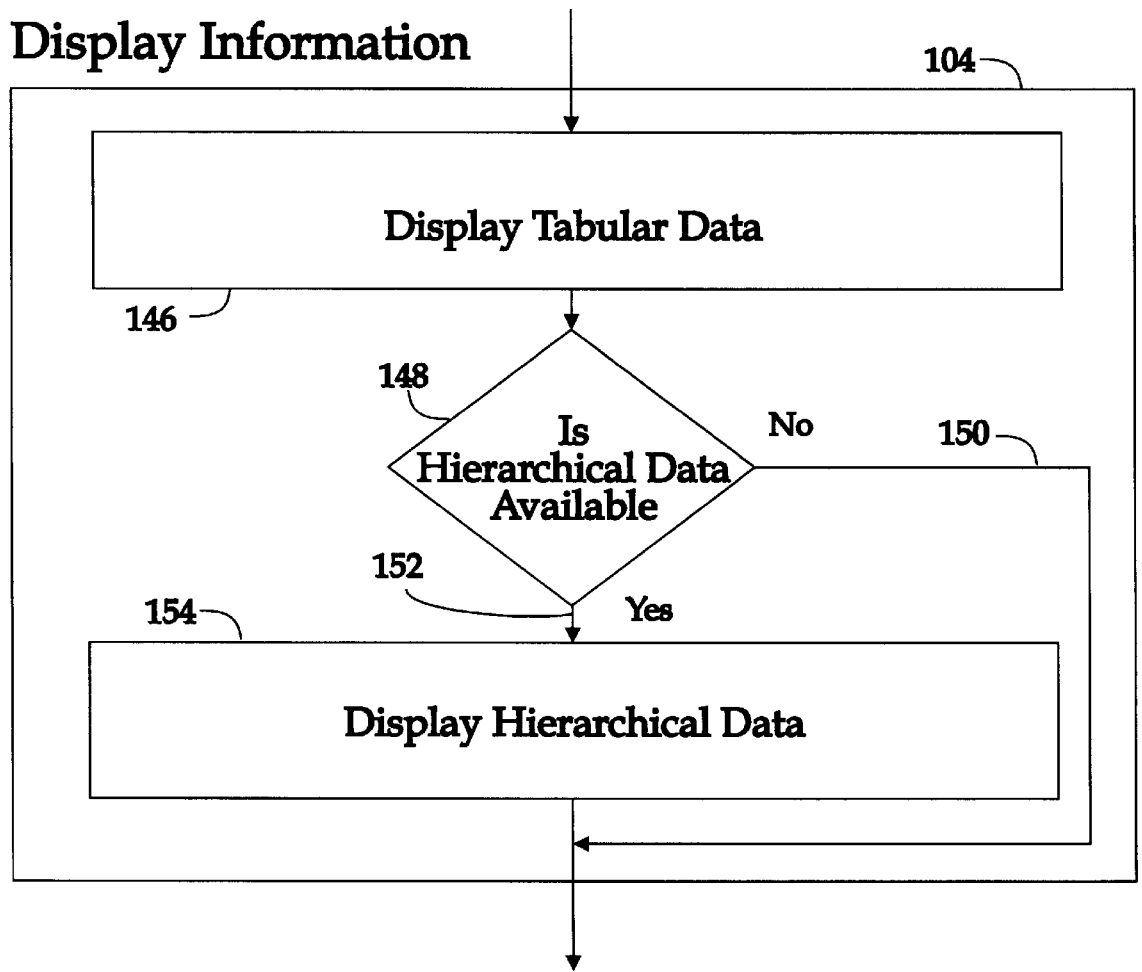
FIG. 8 is a flow diagram illustrating the more specific steps associated with the "Display Information" general step for the first preferred form of the method in accordance with the invention illustrated in FIG. 6.

Continuing, as seen in FIG. 6, following general Get Information step 102 and its associated specific steps 122 to 144, the method includes general Display step 104, for displaying the identified tabular data, and, where designated, the frame-based, hierarchical organization data. As seen in FIG. 8, Display step 104 itself includes a series of more specific steps. Particularly, general step 104 is seen to include: Step 146 at which the method presents the identified tabular data to the user; Conditional step 148 at which the program directs processing flow over branches 150 or 152, depending on whether the user designated hierarchical, structural data to be used, which for the current discussing, as noted, is assumed; i.e., for the current discussion, program flow is considered to advance over branch 152, to step 154 and; Step 154 at which the method displays the identified hierarchical structural data. In this regard, the method would provide for display of the data to the user as one or more screens sequential to the screens at which the user identified the data.

Figure 9:
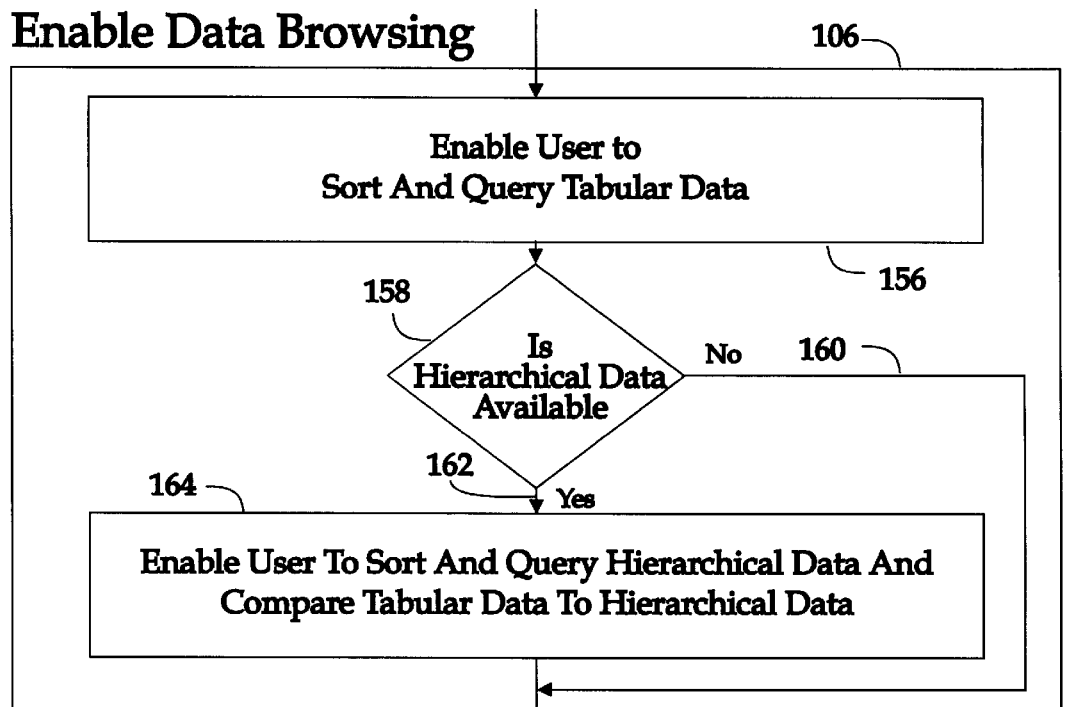
FIG. 9 is a flow diagram illustrating the more specific steps associated with the "Enable Information Browsing" general step for the first preferred form of the method in accordance with the invention.

Thereafter, and as shown in FIG. 6, following presentation of the identified data to the user at step 104, the method, includes step 106 for enabling the user to browse the data to assess what changes to the existing hierarchical organizational structure would be required to accommodate the tabular data to be imported. As shown in FIG. 9, Data Browsing step 106, like previous general steps 102, 104, includes a series of more specific steps. Particularly, step 106 as shown in FIG. 9 includes step 156 at which the method enables the user to sort and query the tabular data. In this regard, it should be understood that the method enables the user to identify and note the product attributes and attribute values in the tabular data, query the tabular data for comparison of the product attributes and attribute values, and note the results.

Additionally, Browsing step 106, like step 104 also includes a conditional step, particularly, step 158, at which the program again selectively directs processing flow over branches 160 or 162 depending on whether the user designated hierarchical, structural data, which again, for the current discussing, is assumed; i.e., over branch 162, to step 164 at which the method also enables the user to sort and query the hierarchical, structural data, and further, compare the tabular data to the hierarchical, structural data.

More specifically, and in accordance with the invention, at Data Browsing step 106, the method enables the user to go through the tabular data, compare it with hierarchical data so as to note if the hierarchical frames, frame levels, frame attributes and attribute values will have to be changed or added to; i.e., newly created, to accommodate the tabular product attributes and attribute values. And, it is at this point the method enables the user to systematically and repeatably develop and fashion the frame-based, hierarchical organizational structure that will be the basis for merging the tabular data, and adapting the existing database so that it can be conveniently maintained.

Continuing, and with reference to FIG. 6, once the user has had the opportunity to analyze the tabular data and the hierarchical structure, and to fashion a plan of modification for the hierarchical structure, the method at conditional step 166 enables the user to indicate whether the plan of modification includes any changes to the frame and frame level organization of the designated hierarchical structure. In the case where the method's enablement of user browsing has yielded a plan of modification for the existing hierarchical structure that calls for change to the frames or frame levels; e.g., where the plan of modification has identified new products types and or product type categories, the method directs program flow over branch 170 to step 108, Create or Modify Frame and Frame Level Data.

Figure 10:
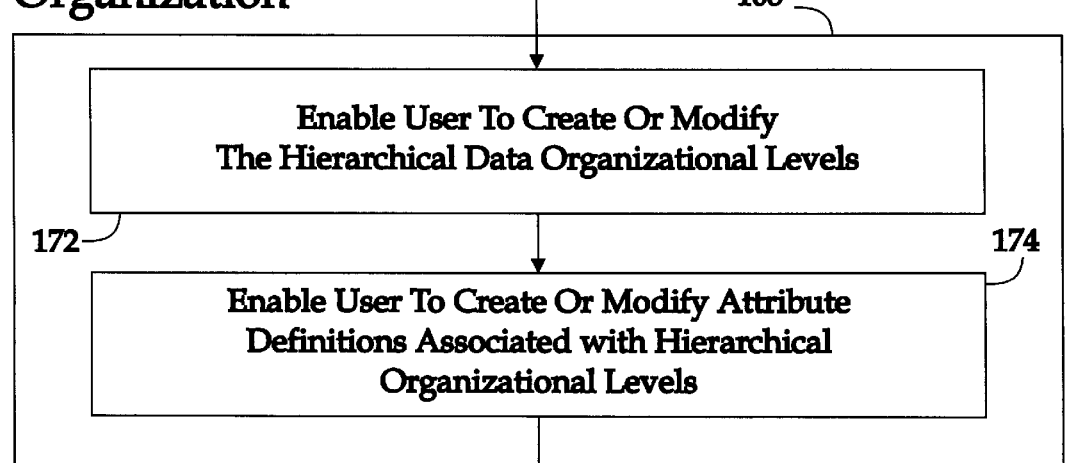
FIG. 10 is a flow diagram illustrating the more specific steps associated with the "Create or Modify Hierarchical Information" general step for the first preferred form of the method in accordance with the invention.

With reference to FIG. 10, general Create or Modify Frame and Frame Level Organization step 108, is also seen to include more specific steps; particulary, step 172 at which the method enables the user to enter modification to the hierarchical frames and frame levels; and step 174 at which the method enables the user to modify the definitions; i.e., names, for the respective frames and frame levels in accordance with the plan of modification.

In the alternative, and as seen in FIG. 6, if user browsing of the tabular and hierarchical data at step 106 has not produced a plan of modification calling for modification to the existing, hierarchical structure frames and frame levels, the method would direct program flow over branch 168 to bypass step 108.

Continuing with reference to FIG. 6, following any user-required modification to the hierarchical fame and or frame level structure at step 108, the method provides another conditional step 176 having branches 178, 180 at which the method enables the user to either proceed to general step 110 over branch 180, to create or modify frame attribute data for the revised hierarchical structural; i.e., attributes and attribute values, to accommodate any change called for by the plan of modification; or, bypass step 110 over branch 178 where the plan of modification requires no change to the frame attributes and attribute values.

Figure 11:
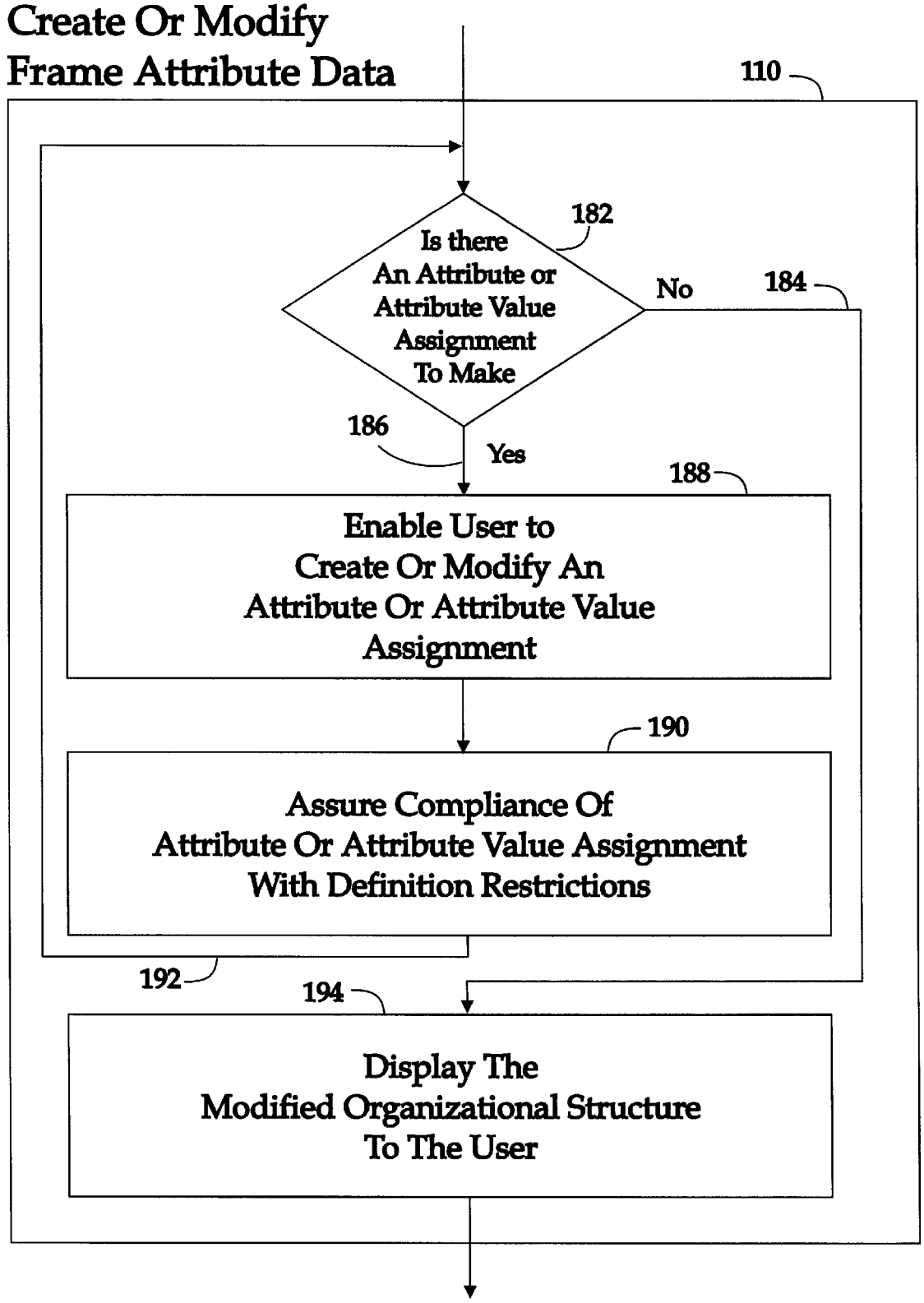
FIG. 11 is a flow diagram illustrating the more specific steps associated with the "Create or Modify Hierarchical Frame Information" general step for the first preferred form of the method in accordance with the invention.

Like the other general steps, Create or Modify Frame Attribute Data step 110 also includes a series of more specific steps. Particularly, as seen in FIG. 11, step 110 includes an iterative loop having a conditional step 182 at which the method prompts the user to identify whether there exists an attribute or attribute value assignment to be modified or created in order to carry out the plan of modification developed in connection with data browsing step 106. If one exists, the method directs program flow over branch 186 to step 188. At step 188, the method enables the user to change or create a new frame attribute and or attribute value assignment for the revised frame structure identified in the plan of modification.

Thereafter, the method includes a further step 190 at which the method prompts the user to confirm that the assignment proposed complies with hierarchical constraints for the frame structure; i.e., that the proposed assignment conform to the attributes and attribute values of the parent and child frames with which the frame where the assignment is to be made is associated. Stated otherwise, step 190 requires that the user confirm that any assignment made be consistent with the hierarchical organizational structure developed. Thereafter, and as seen in FIG. 11, program flow returns from step 190; i.e., loops, over branch 192 to the beginning of general step 110 at conditional step 182, to determine if there are any other attribute or attribute value assignments the plan of modification requires be made. To the extent further frame attribute or attribute assignments need to be modified or created, the method enables the program to iterate until all have been exhausted, at which point, the method completes the modification sequence of step 110 by exiting the iteration loop at branch 184.

As seen in FIG. 11, upon completing the hierarchical organizational structure required to permit importation of the tabular product data, the method at step 194 displays the results to the user for approval. At display step 194, the user can compare and analyze the resulting modified or newly created organizational structure to the plan of modification, the tabular data and the existing organizational structure, if any, and decide whether the resulting structure is acceptable or not. Thereafter, and as seen with reference to FIG. 6, the method includes conditional step 196 having branches 198, 200, at which the method enables the user to either return to the beginning of the organizational structure modification-creation sequence over branch 198; e.g., in the case where because of error of desire for a different outcome, the user elects to redo the modification-creation sequence; or, advance processing over program branch 200 using the organizational structure resulting from step 110.

Continuing, once the organizational structure required to support importation of the tabular data has been developed, the method, next advances to general Attribute Mapping step 112 at which the method enables the user to associate each of the attributes of the tabular product data with the frame attributes of the newly fashioned hierarchical organizational structure. As in the case of the other general method steps, Attribute Mapping step 112 includes a sequence of more specific steps.

Figure 12:
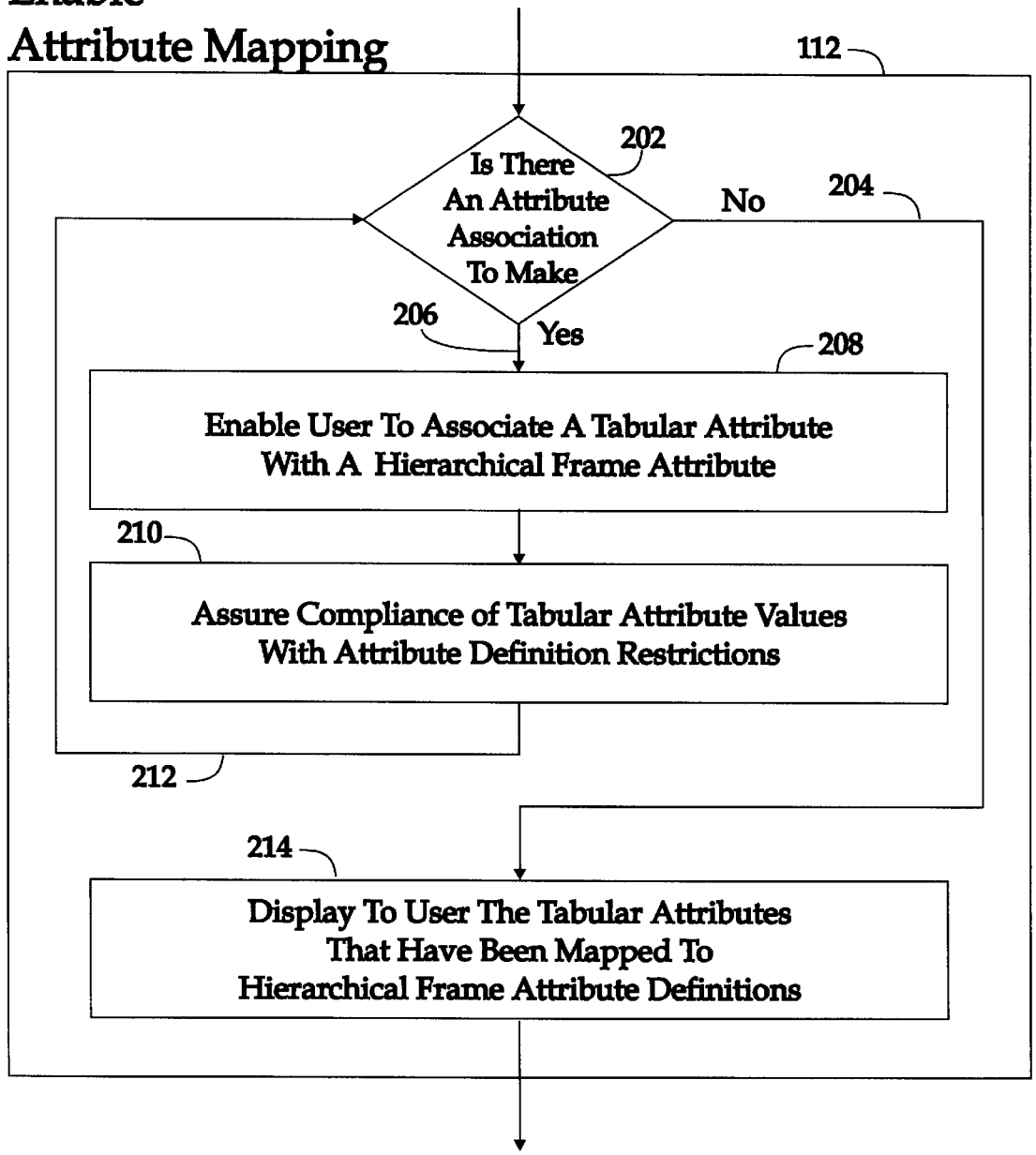
FIG. 12 is a flow diagram illustrating the more specific steps associated with the "Enable Attribute Mapping" general step for the first preferred form of the method in accordance with the invention.
Figure 13:
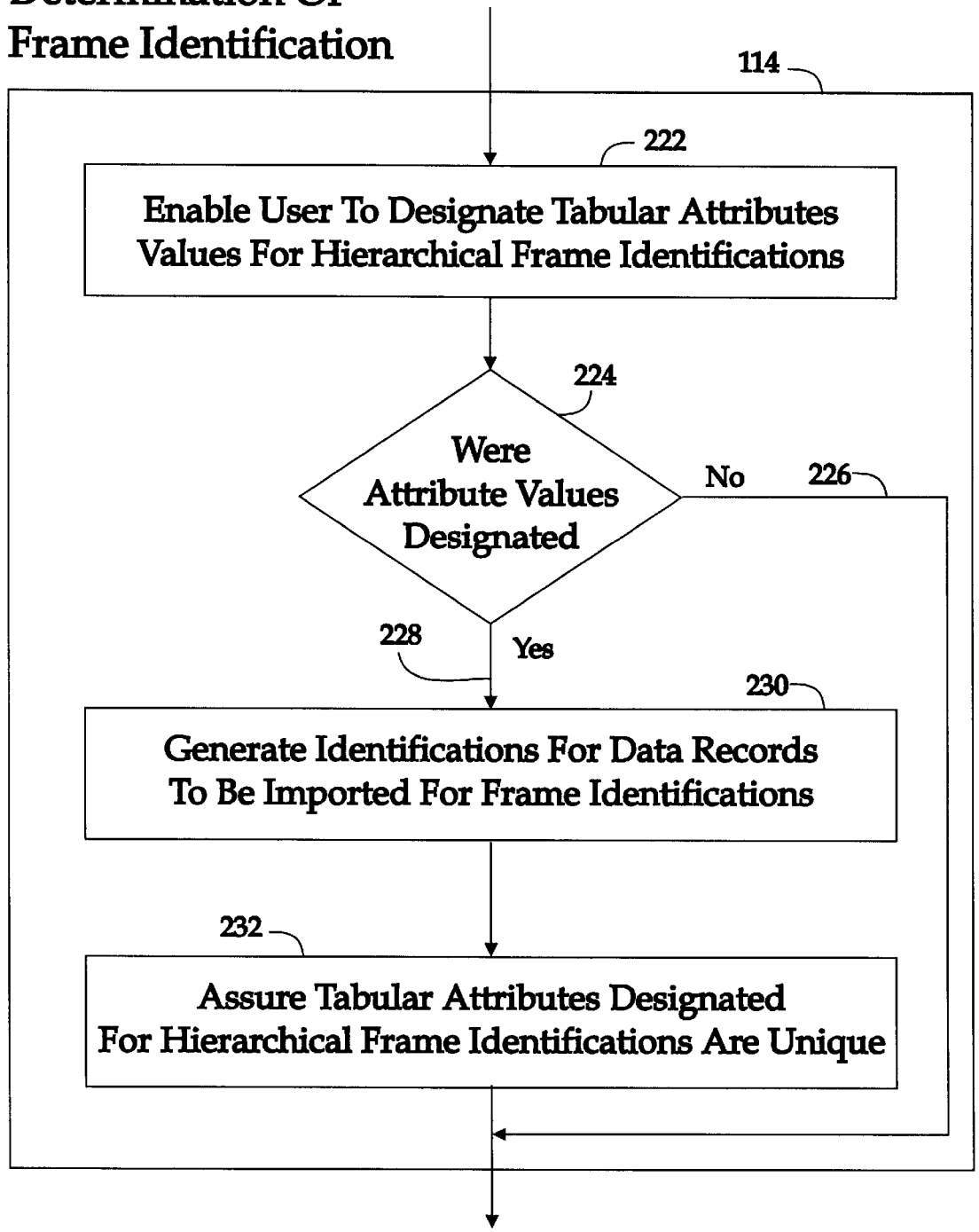
FIG. 13 is a flow diagram illustrating the more specific steps associated with the "Determination of Frame Identification" general step for the first preferred form of the method in accordance with the invention.

As seen in FIG. 12, step 112 also includes an iterative loop with a conditional step 202 having alternative branches 204, 206, at which step the method prompts the user to identify whether a tabular product attribute exists that is required to be associated with a hierarchical frame attribute. If one does exist, the method directs program flow over branch 206 to step 208. At step 208, the method enables the user to associate; i.e., connect, the tabular attribute with a hierarchical frame attribute. In preferred form the method enables the user to monitor attribute association by providing a tabular presentation of the formulated hierarchical attributes juxtaposed with associated tabular product attributes so the user can readily visualize the associations made.

Following association of a tabular attribute with a hierarchical frame attribute at step 208, the method advances to step 210 at which the method confirms that the tabular attribute meets the definition restrictions for the hierarchical attribute with which it is to be associated, the definition restrictions again, being based on the frame parent and child relationships and related attributes established for the organizational structure. Once the association for the tabular attribute is made and confirmed as proper, as seen in FIG. 12, the method directs program flow, to return; i.e., loop, from step 210 over branch 212 back to conditional step 202 of general step 112, to determine if there are any other tabular attributes that require association with hierarchical frame attributes. In the event additional tabular attributes require association, the method enables the sequence to iterate until all the tabular attributes have been properly associated, whereupon, the method completes the attribute-mapping sequence at branch 204 of step 202. Once mapping of the tabular attributes to the hierarchical frame attributes is completed the method displays the results to the user for approval at step 214.

At step 214, the user can, as in other review steps, look over the results; i.e., associations made, and decide whether they are acceptable or not. Thereafter, and as seen in FIG. 6, the method includes conditional step 216 having alternative branches 218, 220 at which the method enables the user to either return to the beginning of Attribute Mapping step 112 over branch 218 in the case where because of error of desire for a different outcome, the user wishes to redo the mapping sequence; or, advance processing over program branch 220 to Record Identification step 114.

Where program flow is advanced to step 114, the method at step 214 enables the user to identify tabular attributes that will facilitate recognition of the tabular records within the hierarchical frame structure. Since the tabular records, respectively, comprise and represent products, the record identification sequence, in effect, constitutes a sequence for enabling identification of products within the hierarchical structure formulated. Once again, like the other general method steps, step 114 also includes a sequence of more specific steps. Particulary, step 114 includes a first step 222 at which the methods enables the user to select a tabular product attribute to act as general identifier for products in the hierarchical frame structure. In preferred form, the record identifier could be selected to be, for example, the tabular attribute model number, the model number for the product being an identifier likely to receive recognition across presentation formats.

Thereafter, method general step 114, includes conditional step 224 having branches 226 and 228 at which the method prompts the user to identify whether a tabular attribute has been designated which will identify the tabular record in the formulated hierarchical frame structure. If the user has designated a record identifier, the method directs program flow over branch 228, to step 230. At step 230, the method generates identifications for the tabular products in the frame-based, hierarchical form. Particularly, the method notes the attribute designated to identify products and, thereafter, relies on the respective tabular values for the attribute to uniquely identify the respective product records. And, associated with generation of product frame identifications, the method next includes step 232 at which the program reviews the identifications for products in the hierarchical database and assures the identification is unique; i.e., acceptable, and will not lead to ambiguity when the product data is called; i.e., processed; e.g., sorted, queried, etc.

Continuing with reference to FIG. 6, following determination of record identification at step 114, the method again includes a confirmation sequence at conditional step 234. As shown, conditional step 234 includes alternative branch paths 236, 237, and enables program flow to, respectively, either return to Record Identification step 114 over branch 236 if the user finds the results of the identification sequence unacceptable; or, in the alternative to enable program flow to advance over branch 238 where the user indicates the record identification results are acceptable.

Figure 14:
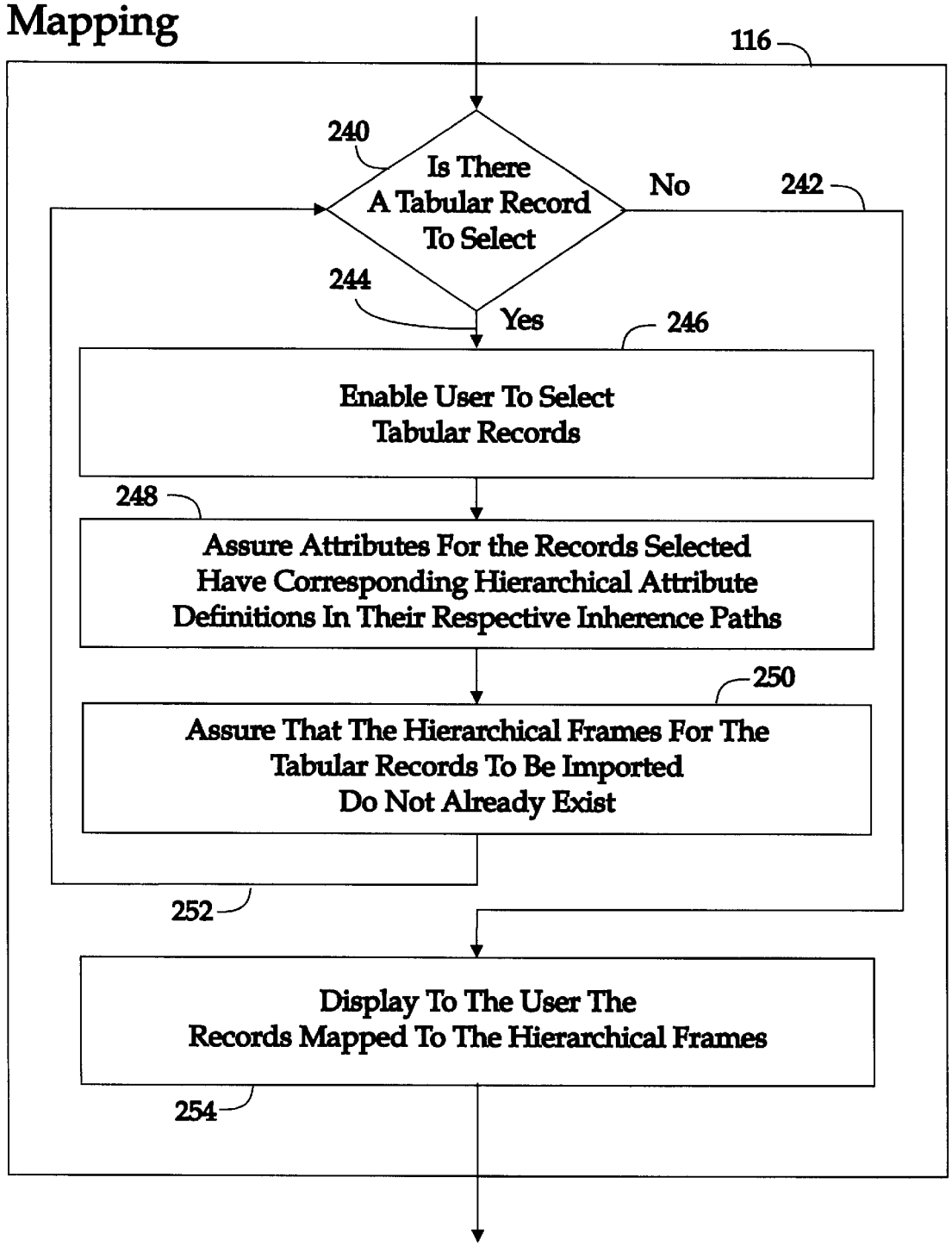
FIG. 14 is a flow diagram illustrating the more specific steps associated with the "Enable Product Mapping" general step for the first preferred form of the method in accordance with the invention.

Following Record Identification step 114 and associated confirmation step 234, the method next includes general step 116 for enabling mapping of the tabular product records to the newly fashioned hierarchical structure. As in the case of the other general method steps, Product Mapping step 116 includes a sequence of more specific steps. As seen in FIG. 14, step 116 also includes an iterative loop having a conditional step and alternative program branch paths. Particularly, general step 116 is seen to include conditional step 240 having branches 242, 244, at which step the method prompts the user to identify whether a tabular product record exist, which is to be imported into the hierarchical frame structure. If a record does exist, the method directs program flow over branches 244 to step 246. At step 246, the method enables the user to select a tabular product to be imported.

Following selection of the tabular product record to be imported, the method at next step 248 prompts the user to confirm that the tabular record meets the attribute definition restrictions for the hierarchical attribute with which it is to be associated, once again, the definition restrictions, being based on the frame parent-child relationships, and associated attributes and attribute values for the frame structure. Following confirmation that the record to be imported conforms to the newly formulated, hierarchical organizational structure, the method, at next step 250 determines whether the record exists in the hierarchical product database. As would be appreciated, if the record proves to already be in the database, it would be disregarded as redundant.

Once the record identified at step 246 is processed at step 248 and 250, the method as shown in FIG. 14 directs program flow back; i.e., loops, from step 250 over branch 252 to conditional step 240 of general step 116, to determine if there are any other tabular records that are to be imported to hierarchical frame structure. In the event additional tabular records are to be imported, the method enables the described sequence to iterate until all the tabular records have been properly identified, whereupon, the method completes the product-mapping sequence at branch 242. Once mapping of the tabular products to the hierarchical frame structure is completed, the method at step 254 displays the results to the user for approval. At step 254, the user can, as in other review steps, look over the results; i.e., product mapping presented, and decide whether those results are acceptable.

Particularly, and as seen in FIG. 6, following Product Mapping step 116 the method includes conditional step 256 having branches 258, 260 at which the method prompts the user to indicate whether based on display of the product mapping results at Mapping Display step 254, the product mapping results are acceptable or not. As in comparable situations, where because of error of desire for a different outcome the user indicates the mapping results are not acceptable, the method enables program flow to be directed over branch 258 to the beginning of Product Mapping step 116 so that the mapping sequence can be redone. In the alternative, where the user indicates the mapping results are acceptable, the method enables program flow to be directed over branch 260 to advance processing.

Continuing with reference to FIG. 6, where the user indicates that the product mapping results are acceptable, program flow rather advanced over branch 260, of step 256, and the method next undertakes conditional step 262 having branches 264 and 266. At step 262 the program embodying the method again prompts the user for approval. However, at step 262, the method seeks the user's approval for all of the processing undertaken to that point. Particularly, the method prompts the user to indicate whether or not either the newly formulated hierarchical organizational structure; the proposed mapping of the tabular attributes; determination of record identifications; and mapping of the tabular product to the formulated, hierarchical structure are acceptable. Further, where the user finds the results of any of these steps unacceptable, and indicates so, the method enables programming flow to be directed over branch 264 back to conditional step 166 where the proposed hierarchical structure for the product database can be refashioned and the associated mapping and other processing of general steps 112, 114 and 116 redone.

In the alternative, where the user finds all results up though Product Mapping step 116 acceptable, and indicates so, the method enables program flow to be directed over branch 266 and processing to advance.

Figure 15:
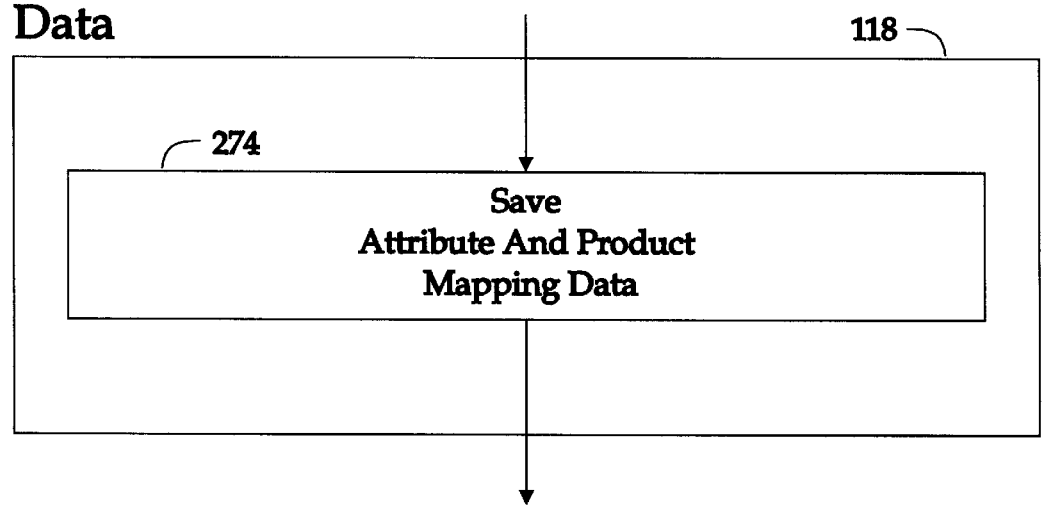
FIG. 15 is a flow diagram illustrating the more specific steps associated with the "Save Mapping Data" general step for the first preferred form of the method in accordance with the invention.

Continuing with reference to FIG. 6, upon confirming the processing results acceptable, and advancing over branch 266, the method next encounters conditional step 268 having alternate branches 270, 272, at which the method prompts the user to indicate whether the results of processing steps 112, 114 and 116; i.e., the mapping specification, should be saved for use in importing tabular product data to the database in the future. If the user indicates the mapping specification is to be saved, the method enables program flow to advance over branch 272 to general step 118 for saving the mapping data. In the alternative, if the user indicates the mapping specification is not to be saved, the method directs program flow to advance over branch 270, bypassing Save Mapping step 118. As seen in FIG. 15, general Save Mapping step 118 simply calls for the mapping specification to be saved at step 274. As would be appreciated, the mapping specification would be saved in any convenient fashion; e.g., as a data file have a suitable name and location path so that the file might be readily located and recalled as needed in the future.

Figure 16:
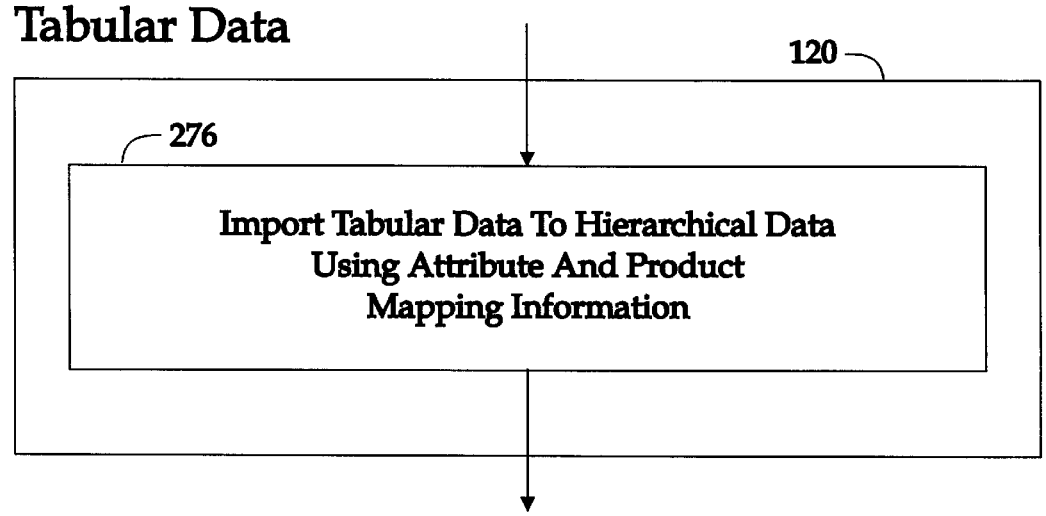
FIG. 16 is a flow diagram illustrating the more specific steps associated with the "Import Tabular Data" general step of for the first preferred form of the method in accordance with the invention.

Finally, following determination of whether or not the mapping specification is to be saved, the method enables the identified tabular data to be imported into the newly formulated, hierarchical database at general Data Import step 120. As shown in FIG. 16, general step 120 includes specific import step 276 at which the method imports the identified tabular data to the newly fashioned hierarchical structure in accordance with the mapping specification developed at general steps 112–116.

Continuing, an illustration of how method 100 operates in practice is provided by considering the incorporation of product data of the type presented in table 50 of FIG. 2, into a hierarchical database having an organizational structure 86 as shown in FIG. 3. For ease of discussion, it will be assumed that in the illustration, all processing proceeds correctly, and, that user finds the results acceptable at each of the optional review steps; e.g., 198, 216, 234, 258 and 262, and elects to advance the method without repeating any steps. Accordingly, based on that assumption, further reference to the review step will be dispensed with.

As noted, where E-commerce shoppers endeavor to review and understand product information when considering a potential purchase, tabular presentation of that information, for example, as shown in table 50, for the reasons described, is less able to communicate the product relationships and comparative features which aid shoppers' comprehension than the hierarchical presentation of that information in a form such as organizational structure 86, even though the table 50 data may be richer in product detail.

Therefore, where product information is supplied in only tabular form, it, becomes desirable for the sake of shopper understanding to put that information into hierarchical form, and, to do so as easily and quickly as possible. Applicants' method enables those objectives to be accomplished.

In accordance with Applicants' method, and as described above, during initial steps 102 and 104 shown in FIG. 6, the user, in response to prompts from the program embodying the method, designates the tabular data to be imported, and, if available, a hierarchical database structure suitable or adaptable for receiving the tabular data. For the current illustration, it is assumed that the desire is to incorporate the product data of table 50 into existing organization structure 86; i.e., maintain the database associated with organizational structure 86 by updating it with the product data of table 50.

Following steps 102 and 104 for getting and displaying the information to be worked on, method 100 enables the user at step 106 to browse the information so that a plan can be formulated for modifying structure 86 so as to permit receipt of the table 50 data.

With reference to FIG. 2, and FIG. 3, to develop a plan of modification for structure 86 it is necessary to first understand the product types and type categories presented in table 50, relative to the frame and frame levels available in structure 86 intended to receive them. Since product types and categories are defined by product attributes and attribute values, it is necessary to first review the tabular attributes and attribute values to determine the types of products present in table 50. Thereafter, it is necessary to compare the tabular attributes, attribute values and product types they suggest with the frame attribute and attribute values of hierarchical structure 86 to determine if hierarchical product types represented by the hierarchical frames, frame attributes and attribute values are adequate to accommodate inclusion of the tabular product types. To the extent the hierarchical frame structure is unable to accommodate the tabular product types, the hierarchical structure must be changed. These respective changes comprise the plan of modification for the hierarchical structure.

In that regard, review of table 50 and organizational structure 86, respectively, shows that while a number of the product attributes in table 50 are included in the frame attribute sets of structure 86, a number are not. And, since as noted, product attributes contribute to the definition of product types, absence of tabular attributes in the hierarchical structure 86 suggests there may be need to add frames and or frame levels in structure 86 to accommodate the tabular data sought to be incorporated into the hierarchical structure. Particularly, while tabular product attributes CPU, RAM, Hard Drive, and Display at table columns 54, 56, 58, and 60, respectively, appear at attribute set 94 of hierarchy uppermost frame 88 for Personal Computers, and Battery Life (Bat. Life) of table column 68 appears at attribute set 98 for Portable Systems, tabular product attributes Audio, CD Rom, Modem and Network (Net) at, respectively, table 50 columns 62, 64, 66 and 70 do not appear in organizational structure 86.

Additionally, review of table 50 and structure 86 also shows that certain of the tabular products have different attribute values, which are not reflected in the hierarchical frame attribute values, and again as noted, since different attribute values may also indicate different product types, the different attribute values suggest yet additional need for modification to structure 86 to accommodate the tabular data. For example, with respect to the attribute Hard Drive, certain products, particularly model DT0010 and PTC070 at rows 74, 84, do not have hard drives. Additionally, certain products have a CRT (Cathode Ray Tube) Display attribute value, particularly DT0015, DT0010, DTH040, DTH030 at rows 72–78, while others have an LCD (Liquid Crystal Display) Display attribute value, particularly LTA060, LTA020, PTC070, at rows 80–82. Further, products DT0050 and DT0010 at rows 72, 74, respectively, include a Network attribute, while the other products, DTH040-PCT070at rows 76–84 do not include a Network attribute. Yet further, certain products have an Audio attribute, respectively, DT0050, DTH040, LTA060, at rows 72, 76, 80, while others do not, particularly, DT0010, DTH30, LTA030, PTC070, at rows 74, 78, 82, 84. Some have a CD ROM attribute, particularly, DR0050, DTH040, LTA060, at rows 72, 76, 80, while others, DT00210, DTH030, LTA020, PTC070 do not. And, some have a Modem attribute, DT0050, DTH040, DTH030, LTA060, respectively, at rows 72, 76, 78, 80, while others, particularly, DT0010, LTA020, PTC070do not.

These attribute and attribute value differences suggest not only product type differences which may require different hierarchical frames, but also, different product relationships which may need different frame relationships within and between hierarchical levels. And, it is these frame levels, frames, attributes, and attribute values represented in the tabular data that will need to be accommodated in the hierarchical framework if all of the information available from the data of table 50 to included in hierarchical organizational structure 86.

With reference to FIGS. 2 and 3, the above-noted differences in the Display attribute and the Battery Life attribute values shown in table 50 do indeed indicate a product type difference which should be included in organizational structure 86. However, as seen in FIG. 3, the product distinctions represented by those attribute values are already present in structure 86. Particularly, in structure 86, the Display attribute and the Battery Life attribute values are the basis for subdivision of Personal Computers of frame 88 into Desktop Systems at frame 90 and Portable Systems at frame 92. Stated otherwise, in accordance with the plan of organization expressed in structure 86, Personal Computers is the broadest class of product, it being the highest level frame 88, while Desktop Systems and Portable Systems at frames 90, 92 respectively, are subcategories of Personal Computers, frames 90 and 92 depending from frame 88.

As will be appreciated, the organization of product types in a hierarchical structure is based on attributes and attribute values, the selection of which, while flexible, is grounded in characteristics that distinguish product function, and or product design features required to meet those functions. For example, in the case of portable computers, the primary objective is to provide the products with features that will enable the units to be transported from place to place. As a result. because portability requires lightweight and compact design to permit ease of transport, a distinguishing characteristic for such products would be use of a LCD displays having smaller form factors and power requirements than CRT displays commonly used in desktop personal computer systems. Further, because use of batteries enable operation of the transported unit to be supported whether an electrical outlet is available or not, it too is an attribute value which serves to distinguish portable systems from desktop systems, desktop systems typically being plugged in an electrical outlet and not relying on batteries as primary source of operating power. In this regard it would be understood that absence of a Battery Life attribute value indicates the product does not use batteries as a primary source of power.

Accordingly, in organizational structure 86, the values for the attributes Display and Battery Life are selected to distinguish between Portable, Personal Computer Systems at frame 92 and Desktop, Personal Computer Systems at frame 90. Particularly, Displays attribute value LCD and the non-zero Battery Life attribute value denote portable-type personal computers, and products having a Display attribute value CRT and no Battery Life attribute; i.e., no battery life value, denotes Desktop Personal Computers included at frame 90, the alternate category to Portables Personal Computer Systems as is well known in the trade. And, because these attributes and attribute values are already present in structure 86, no change need be made to accommodate them.

As would also be appreciated, since frames 90 and 92 are "child" frames of "parent" frame 88, frames 90, 92 carry; i.e., inherit, all the attributes of the parent, specifically, the attributes CPU, RAM and Hard Drive.

Continuing, review of table 50 also shows that for products having a Display attribute value of LCD, and a non-zero Battery Life attribute value; i.e., Portable Systems, also have differences in other attributes and attribute values which suggest yet additional frame and frame level are required subordinate to Portable Systems frame 92. Particularly, review of the products in table 50 having a Display attribute value of LCD and a non-zero Battery Life value, particularly, products LTA060, LTA020 and PTC070, at rows 80, 82, 84 respectively, shows that products LTA060, LTA020 have a Hard Drive attribute value, while product PCT070 does not. Further, absence of a Hard Drive attribute as combined with other attributes of low value associated with the PTC070 product, particularly, CPU, and RAM, indicates that the PCT070 product is a "palmtop" system, which features ultra small size, and reduced capability, particularly, no hard drive. On the other hand, presence of a hard drive and comparatively larger CPU and RAM attribute values for the LTA060, LTA020 products relative to palmtop systems indicates products LTA060, LTA020 are portable computer systems commonly referred as "laptops" which are distinguished from palmtop systems.

Upon reference to organizational structure 86, however, it is seen that no frame exists for palmtop systems or indeed laptop systems. Accordingly, suitable change to structure 86 for addition of frame level below Portable Systems frame 92, having which frame level including a frame for laptop, portable, personal computer system and a frame for palmtop, portable, personal computer systems would be noted in the plan of modification for structure 86.

Figure 4:
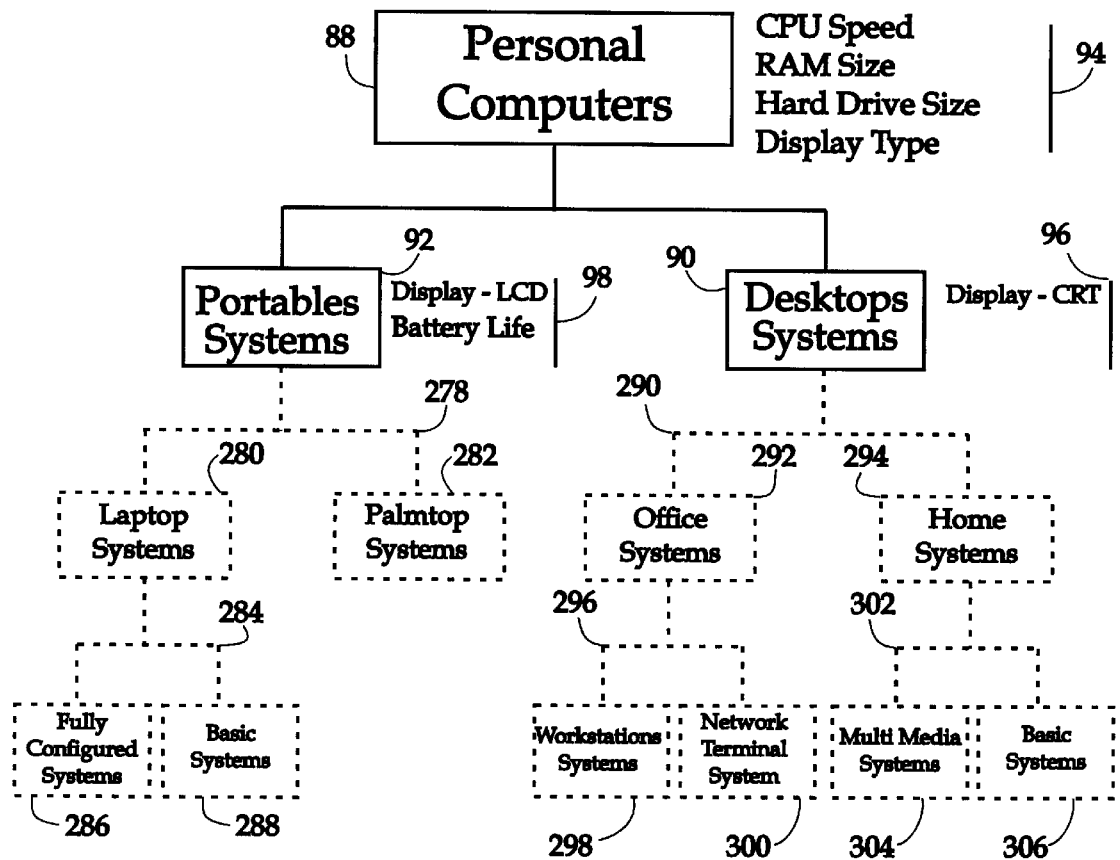
FIG. 4 is a block diagram illustrating intermediate modifications to the frame-based, hierarchical organizational structure illustrated in FIG. 3, made in accordance with the method of the present invention in a first preferred form based on the tabular computer system data illustrated in FIG. 2.

In that regard, FIG. 4 illustrates a plan of modification for organization 86 shown in dotted lines which includes a proposed new frame level 278 depending from frame 92 for Portable Systems, new frame level 278 having a proposed frame 280 for Laptop Systems, and a proposed frame 282 for Palmtop Systems. As would be appreciated, based on the data of table 50, laptop systems of frame 280 would be distinguished from the palmtop systems of frame 282 at least by virtue of their non-zero Hard Drive attribute, i.e., laptop system having a Hard Drive attribute value, and palmtop system not having a Hard Drive attribute value; i.e., no hard drive. And, as would also be appreciated, laptop system of frame 280 and palmtop system of frame 282 would also have the common attributes and attribute values from their Portable System parent at frame 92, particularly, an LCD Display attribute value, and a non-zero Battery Life attribute value; and, the CPU and RAM attributes from their Personal Computers grand parent at frame 88.

Still further, and continuing with reference to the portable systems of table 50; i.e., products having a Display attribute value of LCD, and a non-zero Battery Life attribute value, particularly, LTA060, LTA020 and PTC070, it is seen that the products identified as laptops, by virtue of having non-zero Hard Drive attribute value, have other attributes values which are different and potentially suggestive of yet further distinction of product type. Particularly, product LTA060, at row 80, is seen to have non-zero values for the attributes Audio, CD ROM and Modem at respective columns 62, 64, 66, while the product LTA020 at 82 is seen to have no values for these attributes, indicating they are not included in the LTA020 product. Accordingly, from this it would be appreciated that the LTA060 product represents a "multi-media"; i.e., fully configured laptop well known in the trade and LTA030 represents a "basic"; entry level, laptop also well known in the trade.

However, again, upon reference to organizational structure 86, it is seen that no frame exists for either multi-media, laptop, portable, personal computer systems; or basic, laptop, portable, personal computer systems. As a result, change to structure 86 for addition of a frame level below Laptop Systems would be called for, that frame level including a respective frame for multi-media, laptop systems, and a frame for basic, laptop systems.

Again, the plan of modification for organization 86 shown FIG. 4 is seen to include addition of an appropriate frame level and associated frames. Specifically, FIG. 4 shows a proposed new frame level 284 which depends for frame 280 for Laptop Systems, level 284 having a proposed frame 286 for Multi-Media Systems, and a proposed frame 288 for Basic Systems. Based on the data of table 50, multi-media, laptop portable systems of frame 286 would be distinguished from the basic systems of frame 288 at least by virtue of their non-zero Audio, CD ROM and Modem attribute values; i.e., multi-media laptop system having values for these attributes, and basic laptop system not having values for the noted attributes, indicating the absence of the noted attributes from the basic laptop systems. Further, and as was the case with the higher level frames previously discussed, multi-media, laptop system of frame 286 and basic laptop systems of frame 288 would also have the common attributes and attribute values of their Laptop System parent at frame 280, particularly, a non-zero Hard Disk attribute value; and the attributes and attribute values of their portable grand parent at frame 92 particularly, an LCD Display attribute value, and a non-zero Battery Life attribute value; and, still further, the CPU and RAM attributes from their Personal Computers great, grand parent at frame 88.

In a comparable fashion, analysis of table 50 for products having a Display attribute value of CRT and no value for the Battery Life attribute; i.e., Desktop Systems of structure 86, also have differences in other attributes and attribute values which, again, would suggest addition of a frame and frame level are required for structure 86. Particularly, review of the products in table 50 having a Display attribute value of CRT and no value for the Battery Life attribute, specifically, products DT0050, DT0010, DTH040 and DTH030, at rows 72, 74, 76 and 78, respectively, shows that products DT0050 and DT0010 have a Local Area Network attribute value and products DTH040 and DTH030 do not. And, since a local area network feature is typical of office systems, and not typical of home Systems, this attribute value indicates that the DT0050, and DT0010 products are indeed "office" system, and the DTH040 and DTH030 are home systems.

However, on review of organizational structure 86, it is seen that no frame exists for office systems, or home systems. As a result, appropriate change to structure 86 for the addition of a frame level below Desktop Systems frame 90 having a frame for office, desktop, personal computer systems and a frame for home, desktop personal computer systems would be noted in the plan of modification for structure 86.

Again with regard to FIG. 4, in accordance with the noted suggested changes to the desktop system hierarchy, the illustrated plan of modification for organization 86 includes a proposed new frame level 290 which depends from frame 90 for Desktop systems, and is shown to have a proposed frame 292 for Office Systems, and a proposed frame 294 for Home Systems. And, with reference to the data of table 50, the office systems of frame 292 are seen to be distinguished from the home systems of frame 294, at least by virtue of their non-zero Network attribute value, i.e., office systems having a Network attribute, and home systems system not having a Network attribute value.

As in the case of other frames previously described the office systems of frame 292 and home systems of frame 294 would inherit the common attributes and attribute values of their predecessor frames. Particularly, office systems at frame 292 and home systems 294 would respectively include CRT Display attribute value, and no Battery Life attribute of their Desktop System parent at frame 90; and the CPU and RAM attributes from their Personal Computers grand parent at frame 88.

Continuing with reference to the office systems of table 50; i.e., products having a Network attribute value, particularly, products DT0050 and DT0010, it is seen that these units identified as office systems by virtue of their non-zero Network attribute value, have other attributes values which are different which suggestive of yet further distinction of product type. Particularly, product DT0050 at row 72, is seen to have non-zero values for the attributes Audio, CD ROM and Modem at respective columns 62, 64, 66, while the product DT0010 at row 74 is seen to have no values for there attributes, indicating they are not included in the DT0010 product. From this and the substantial values for other attributes such as CPU, RAM and Display size, it would be understood that the DT0050 product represents a "workstation;" i.e., comprehensively configured, office unit well known in the trade, and that DT0010, in view of the absence of such attributes, represents a "network terminal" for an office network, again well known in the trade.

Once more, upon reference to structure 86, it is seen that no frame exists for workstation, office, personal computer systems; or, basic terminal, office, personal computer systems. Accordingly, once again change to structure 86 is called for, particularly, addition of frame level below Office Systems frame 292, the new frame level including a frame for workstation, office systems, and a frame for basic terminal, office systems.

As before, the plan of modification for organization 86 shown FIG. 4 is seen to include addition of the appropriate frame level and frames. Particularly, FIG. 4 shows a proposed new frame level 296 having a proposed frame 298 designated Workstation Systems, and a proposed frame 300 designated Basic Terminal Systems. And, based on the data of table 50, workstation, office systems of frame 298 would be distinguished from the basic terminal office systems of frame 300 at least by virtue of their non-zero Audio, CD ROM and Modem attributes; i.e., the workstation, office systems having these attributes, and basic terminal, office systems not having them. As with the other frame discussed, the workstation, office systems of frame 298, and basic terminal, office systems of frame 300 would have the common attributes and attribute values of their office systems parent at frame 292, particularly, a non-zero Network attribute value, and the attributes and attribute values of their desktop grand parent at frame 90, particularly, a CRT Display attribute value, and no Battery Life attribute value, as well as and the CPU and RAM attributes from their Personal Computers great, grand parent at frame 88.

Yet further, and, with reference to the home systems of table 50; i.e., products having a zero Network attribute value, particularly, DTH040 and DTH030, it is seen that these products identified as home systems because of their zero Network attribute value, also have other attributes values which are different and potentially suggestive of still further product-type distinctions. Particularly, product DTH040 at row 76, is again seen to have non-zero values for the attributes Audio, and CD ROM at respective columns 62, and 64, while the product DTH030 at row 78 is seen to have no values for these attributes, indicating they are not included in the DTH030 product. From this and the greater values for other attributes such as CPU, RAM and Display size, it would be appreciated that the DTH040 product represents a "multi-media"; i.e., fully configured, home or small office unit well known in the trade, and DTH030, in light of the absence of such attributes, represents a "basic"; i.e., entry-level, home or small office unit again well known in the trade.

Upon reference to structure 86, it is once more seen that no frame exists for suggested additional product types, in this case, either multi-media, home, personal computer systems, or basic, home, personal computer systems. Thus, again change to structure 86 is required, particularly, addition of a frame level below Home Systems frame 294, the new frame level including a frame for multi-media, home systems, and a frame for basic, home systems.

Again, the plan of modification for organization 86 shown FIG. 4 is seen to include addition of the appropriate frame level and frames for the noted changes. Particularly, FIG. 4 shows a proposed new frame level 302 having a proposed frame 304 designated Multi-Media Systems, and a proposed frame 306 designated Basic Systems. And, based on the data of table 50, the multi-media, home systems of frame 304 would be distinguished from the basic, home systems of frame 306 at least by virtue of their non-zero Audio, and CD ROM attribute values; i.e., the multi-media, home systems having these attributes, and the basic, home systems not having them. As with the other higher level frames discussed, the multi-media, home systems of frame 304 and basic, home systems of frame 306 would inherit the common attributes and attribute values of the frames from which they depend. Particularly, the multi-media, home systems of frame 304 and the basic, home systems of frame 306 would inherit a zero Network attribute value from their home systems parent at frame 294, and a CRT Display attribute value, and no Battery Life attribute value from their desktop grand parent at frame 92, as well as the CPU and RAM attributes from their Personal Computers great, grand parent at frame 88.

Continuing, in preferred form, the program embodying the method provides alternate and or concurrent screen display of tabular data 50 and organizational structure 86. Additionally, the program permits the user to work interactively with the tabular data and organizational structure enabling the user to graphically correlate the identified tabular attributes, attribute values and identified product types with the frame levels, frames, frame attributes and frame attribute values of the modified structure so that the change information for the modified organizational structure can be interactively generated and inventoried.

Following browsing of table 50 data and organizational structure 86 at step 106 and generation of the plan of modification, the method as shown in FIG. 6 enables implementation of the changes to the organizational structure at method steps 108 and 110. In a first implementation of the first preferred form of the method, entry of the changes to the structure can be facilitated through user interactivity, so that the user can oversee and control execution. However, in second implementation of the first preferred form, program embodying the method implementation of the identified changes can proceed automatically, for example, from a modifications file generated by the program in connection with browsing step 106.

Continuing with reference to FIG. 6, once the changes to organizational structure 86 have been implemented, the method at step 112 enables the user to confirm that the tabular attributes have been properly associated with the frame attributes. To accomplish this, the method permits the tabular attributes to be presented juxtaposed in an attribute mapping register with the frame attributes so all product attributes from table 50 can be accounted for, and assured to comply with the hierarchical structure definitions. In the current illustration, the attribute mapping for the table 50 data and organizational structure 86 would appear as follows:

| TABULAR ATTRIBUTES | HIERARCHICAL ATTRIBUTES |
| --- | --- |
| Model Number | Model Number |
| CPU Speed | CPU |
| RAM Size | RAM |
| Hard Drive Size | Hard Drive |
| Display Type | Display |
| Audio Support | Sound |
| CD ROM Support | CD ROM |
| Modem Speed | Modem |
| Battery Life | Battery Life |
| Network Support, Local Area | Network |

Figure 5:
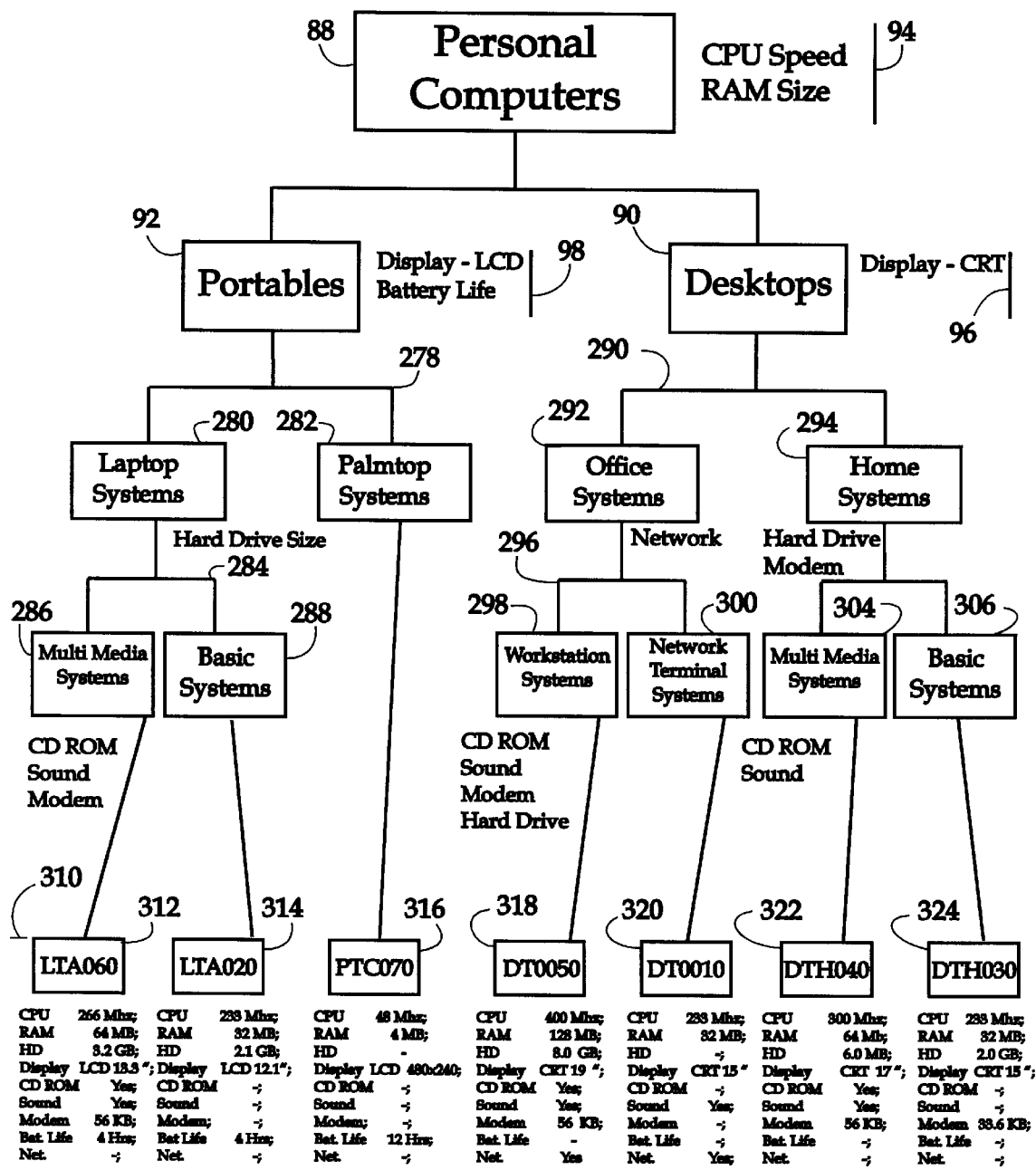
FIG. 5 is a block diagram illustrating the final modifications to the frame-based, hierarchical organizational structure illustrated in FIG. 3, made in accordance with the method of the present invention in a first preferred form based on the tabular computer system data illustrated in FIG. 2.

As seen in FIG. 6, once the tabular attributes have been mapped at step 112, the method next enables the user to select the tabular attribute which will be used to identify the product records in the hierarchical frame structure. In preferred form the use would select an attribute unique to the record; for example, the tabular product model number. To carry out the tabular record identification, a further hierarchical level is added to the organizational structure beneath the lowest hierarchical level entered in connection with the plan of modification. In the current illustration, and as best seen in FIG. 5, organization structure 86 is provided with a product identification level 310. The tabular model number attribute value for the respective tabular products would, thereafter, identify the hierarchical frame for the respective products in the hierarchical organization, again as best seen in FIG. 5. And, in the present illustration, the tabular product numbers, DT0050, DT0010, DTH040 DTH030, LTA060, LTA020 and PTC070 respectively appear as product frames 312, 314, 316, 318, 320, 322, and 324 of frame level 310 shown in FIG. 5.

Continuing with reference to FIG. 6, as seen, following selection of the tabular attribute to identify the tabular record in the hierarchical structure, method 100 enables the user to map the tabular record to the hierarchical structure. To facilitate this, a product mapping register is generated for the tabular records to be imported, the register indexing the tabular product records of the table to the relevant frame of modified hierarchical structure 86 for the respective tabular product records. In the current illustration, the product mapping for the table 50 data and organizational structure 86 would appear as follows:

| TABULAR RECORD | HIERARCHICAL FRAME |
| --- | --- |
| DT0050 | Workstation, Office, Desktop, P.C. |
| DT0010 | Basic Terminal, Office, Desktop, P.C. |
| DTH040 | Multi-Media, Home, Desktop, P.C. |
| DTH030 | Basic, Home, Desktop, P.C. |
| LTA060 | Multi-Media, Laptop, Portable, P.C. |
| LTA020 | Basic, Laptop, Portable, P.C. |
| PTC070 | Palmtop, Portable, P.C. |

In the case of the current illustration, the product mapping would appear as shown in FIG. 5, the association of the respective tabular product records at their respective product frames, 312, 314, 316, 318, 320, 322, and 324, being associated with the hierarchical frame to which they respectively relate.

As seen with reference to FIG. 6, once product mapping at step 256 has been successfully completed, and the results of processing to that point accepted by the user at review step 262, the program embodying the method prompts the user to indicate at step 268 whether the mapping specification; i.e., the processing results to that point are to be saved. If the user wishes to save the mapping specification; e.g., for future use in importing tabular data, the user in conventional, digital-data fashion, would supply a name for the mapping specification file, and a path identifying where the mapping file is to be saved; i.e., stored.

Finally, and again as shown in FIG. 6, following the user's determination of whether the mapping specification is to be saved at step 262, the method at step 120 undertakes importation of the product data of table 50 into the modified form hierarchical structural 86 developed in accordance with the method and as expressed in the mapping specification.

Continuing, as explained above, the method of the present invention also includes a second preferred form. As noted earlier, where the tabular product data sought to be presented in hierarchical form includes category and subcategory information sufficient to define the organizational structure required to accommodate importation, the method in accordance with a second preferred form of the invention includes program; i.e., software, steps for automatically generating the needed frame-based, hierarchical organizational structure required to accommodate incorporation of the product data.

More specifically, in FIG. 17, a table 400 of products is provided, comparable in form to that of table 50 in FIG. 2. However, in the case of table 400, and for the purposes of the following discussion, the product records presented are seen to concern cameras. As in the case of table 50, table 400 features a plurality of columns 402–420 including product attributes; i.e., features, for the cameras presented as a plurality of rows 422–432. Further, on inspection, the product attributes for the cameras presented in table 400 are found to include, respectively: Model Name at column 402; Class at column 404; Type at column 406; Model Number at column 408; Body Color at column 410; Flash at column 412; Rewind at column 414; Lens at column 416; Resolution at column 418; and LCD Size at column 420. Further, the camera products as identified by their respective Model Name attributes are seen to include: Quick A21 at row 422; Easy Z25 at row 424; Pro H15 at row 426; Cobra at row 403; Image at row 430 and Picture II at row 432. And, still further, as in the case of table 50, the respective product records include attribute values at the cells defined by the intersection of product rows and attribute columns.

Upon closer consider of table 400, it will be appreciated that since product attributes that identify category and subcategory such as Class and Type are included in the table data, the tabular data contains information from which a frame-based hierarchical structure to accommodate the product records might be generated. Yet further, in view of the inclusion in table 400 of the various other attributes for the respective products in combination with the respective category and subcategory attributes, the data also includes sufficient information from which it might also be possible to establish the respective frame attributes and attribute values for the product frames of the hierarchical structure without intervention of the user. The method of the present invention, in its second preferred form comprehends a procedure for accomplishing those objective.

Figure 20:
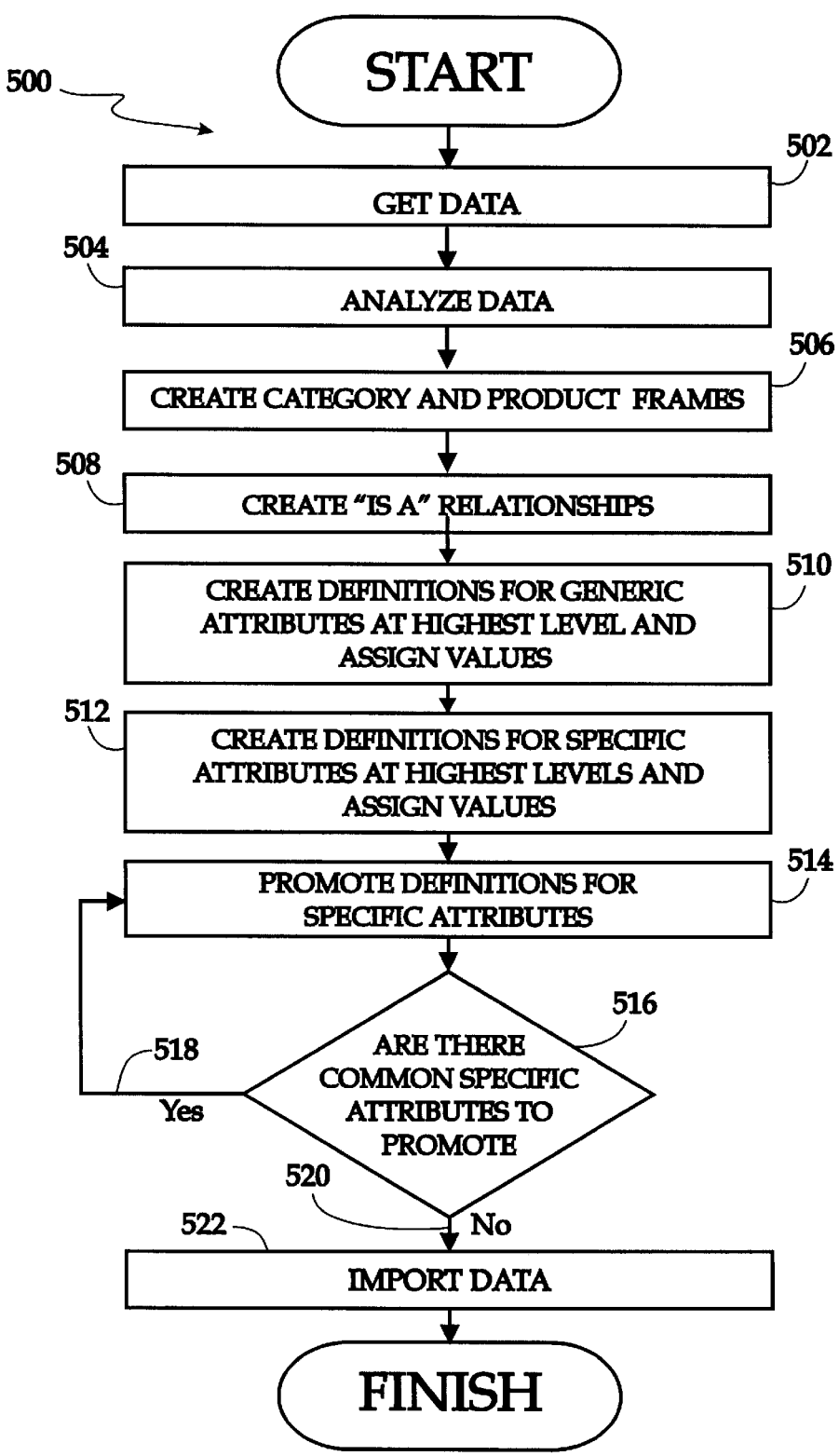
FIG. 20 is a flow diagram illustrating the general steps of a second preferred form of the method in accordance with the present invention.

More specifically, the method of the present invention in a second preferred form adapted for automatically generating a hierarchical structure to accommodate and present tabular data is shown in flow-diagram layout in FIG. 20. In its second form, the method is again implemented in software and embodied in a computer program with which the user would interact. However, for the second form of the method, the reliance on the user is limited to identification of the tabular data to be incorporated into the frame-based hierarchical form, and designation of the disposition for the resulting file, the method, as embodied in the program undertaking the automatic generation of the database structure and importation of the tabular data.

As shown in FIG. 20, the second form of the method is designated 500, and includes a step 502 entitled Get Data at which the program prompts the user for identification of the tabular data to be incorporated into frame-based hierarchical form. As in the case of the first form of the method, the prompt, preferably, would be provided as a display at the screen of a monitor associated with a computer at which the program embodying the method is running.

In response, the user would identify the source of tabular data of table 400 in conventional fashion; e.g. by designating a file name and path for locating the file. And, as noted in connection with the first form of the method, alternatively, the tabular data could be provided by any convenient manner; e.g., entered by the user, or another program active either local to the subject method program, or remote, such as over a network. Thereafter, the program embodying method 500 would recover the data and advance to next step 504 Analyze Data.

At Analyze Data step 504, the method reviews the tabular data of table 400 and extracts information for building a series of registers that are subsequently used in formulating the frame-based, hierarchical structure for the data. Particularly, the method prepares a Category register that lists the product categories and subcategories for the data, which in the case of table 400 would include the Class attribute value Camera at table 400 column 404, as a category, and the Type Attribute values SLR (Single Lens Reflex), Digital and Point & Shoot at table 400, column 406, as subcategories. This analysis includes the resolution of duplicate names to avoid ambiguity of frame names. In the case that duplicates are encountered, these are qualified by the name of the parent frame to insure uniqueness. For example, a category "Hardware" may exist in the tabular data. However, the creation of a frame with the unqualified name "Hardware" may create conflict with other frames that represent categories such as "Computer Hardware", "Garden Tool Hardware", "Construction Hardware", or "Power Tool Hardware."

In the case of table 400, the Category register would appear as follows:

| CATEGORIES/SUBCATEGORIES |
|---|
| Camera |
| SLR Camera |
| Digital Camera |
| Point & Shoot Camera |

As will be appreciated, and as seen with reference to table 400, since the Class attribute value Camera is a term of classification common to all products, the method identifies it as a category and parent for the Type attribute values SLR, Digital, and Point & Shoot, respectively, also terms of classification for cameras, but common to only some of the products included in the table. As will also be appreciated, if table 400 includes category and subcategory information under attribute names other than Class and Type, the method would identify the category subcategory information by comparison to a term reference look up, and apply successive applications of logic operations to establish the highest order category for the products, and respective subcategories subordinate to the main category based on commonality of association within the respective product records.

In addition to creating a categories register, the method at step 506 also creates a Products register which list the products of the respective rows of table 400, using a suitable identifying attribute; e.g., Model Name, the attribute value identifying the respective products. In the case of table 400, the Products register would look as follows:

| PRODUCTS |
|---|
| Quick A21 |
| Easy Z25 |
| Pro H15 |
| Cobra |
| Image Total |
| Picture Easy |

Still further, in addition to creating registries for Category and Product, the method also creates a registry for the relationships of categories and products based on the attribute values provided in table 400. In effect, and in accordance with the invention, the Relationships registry identifies so called "IS A" characteristics for the respective products and recognizes the respective hierarchical, parent and child association for them. And, in the case of table 400 the Relationships registry would appear as follows:

| RELATIONSHIPS | |
|---|---|
| PARENT | CHILD |
| Camera | SLR Camera |
| Camera | Digital Camera |
| Camera | Point & Shoot |
| SLR Camera | Cobra |
| SLR Camera | PRO H15 |
| Digital Camera | Image |
| Digital Camera | Picture II |
| Point & Shoot | Quick A21 |
| Point & Shoot | Easy Z25 |

Figure 18:
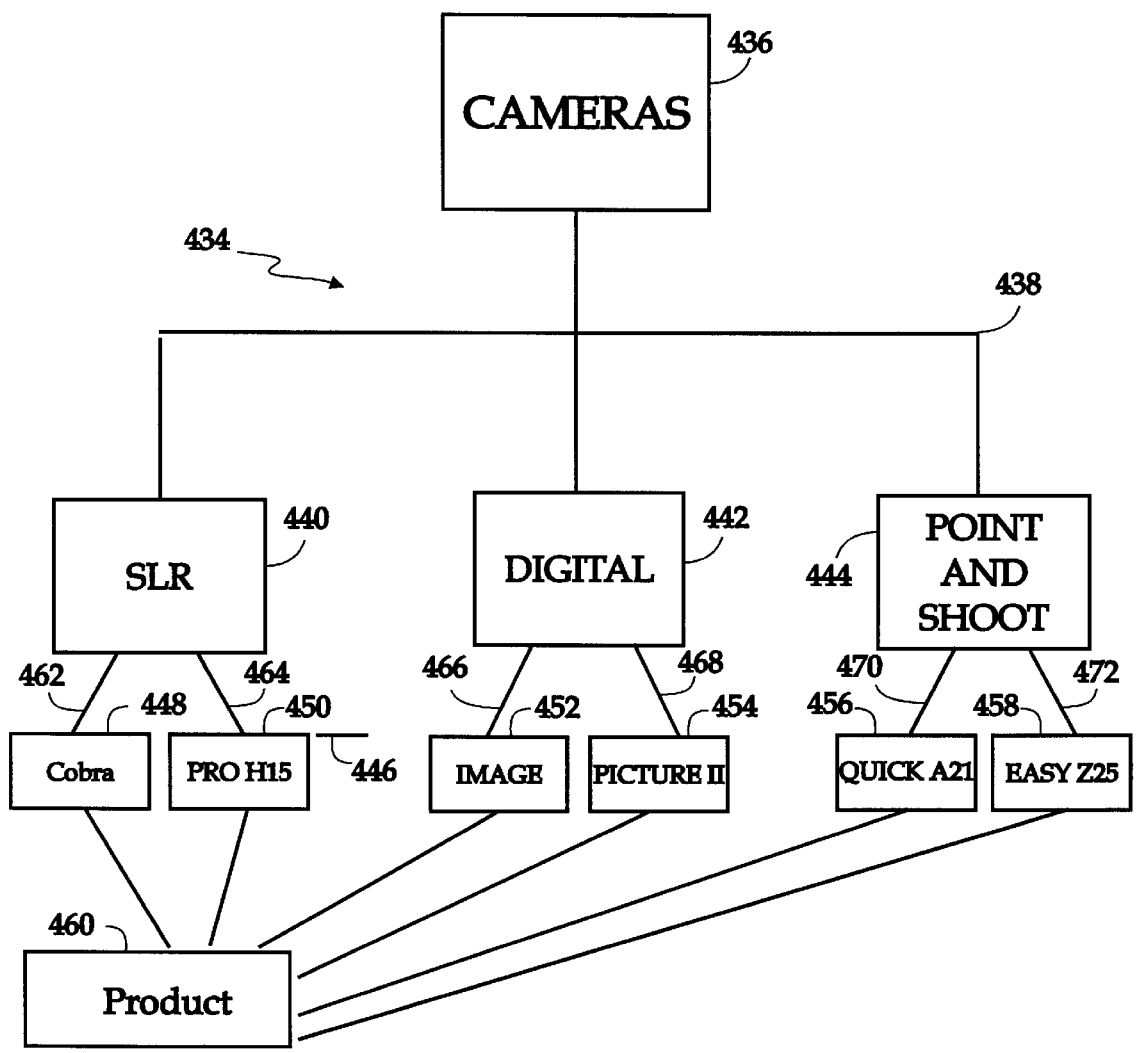
FIG. 18. is a block diagram illustrating a frame-based, hierarchical organizational structure suitable for a database created or maintained in accordance with the method of the present invention in a second preferred form.

Following analysis of the tabular data and generation of the respective data registries at step 504, the program advances to Create Category and Product Frames step 506 at which the program embodying the method begins development of the frame-based hierarchical structure to accommodate the table 400 product data. Particularly, and with reference to FIG. 18 in which hierarchical structure 434 to accommodate the table 400 data is shown in preliminary form, the program, in accord with the category-subcategory hierarchy identified in the Category registry, at step 506 initially establishes a first; i.e., highest, frame level and frame 436 for Cameras, frame 435 representing the main category of product identified in table 400. Additionally, the program at step 506 also establishes a subordinate level 438 beneath category frame 436, for subcategory frames 440, 442 and 446; subcategory frames 440, 442 and 446, respectively, representing SLR cameras, Digital cameras and Point & Shoot cameras. Still further, at step 506, the program further establishes a level for product frames beneath category-subcategory frame and a further level for a product identification frame. Particularly, as seen with reference to FIG. 18, structure 434 is provided with a product frame level 446 beneath subcategory frame level 438, product level 446 including frames 448–458, respectively, for camera products designated: Cobra; Pro H15; Image; Picture II. Quick A21; and Easy Z25. Further, a product identification frame 460 is also provide for convenience of illustration and to avoid association lines crossing features of the figure, below the products. However, as should be appreciated, Products frame 460 would actually be comparable in frame level to Cameras frame 436.

Following, generation of an initial form of hierarchical structure 434 at step 506, processing advances to Create "IS A" Relationship step 508 at which the program continues development of structure 434 by identifying the respective hierarchical associations for the table 400 products relative to the category-subcategory structure. To accomplish this the program refers to the Relationships register, and identifies the associations included there.

Particularly, based on reference to the Relationships register, the Cobra and Pro H15 products are seen to be SLR cameras, as indicated, respectively, by association lines 462, 464; and the Image and Picture II products, Digital cameras, as noted, respectively, by association lines 466, 468; and the Quick A21 and Easy Z25 products, Point & Shoot cameras as shown by association lines 470, 472 respectively.

Figure 19:
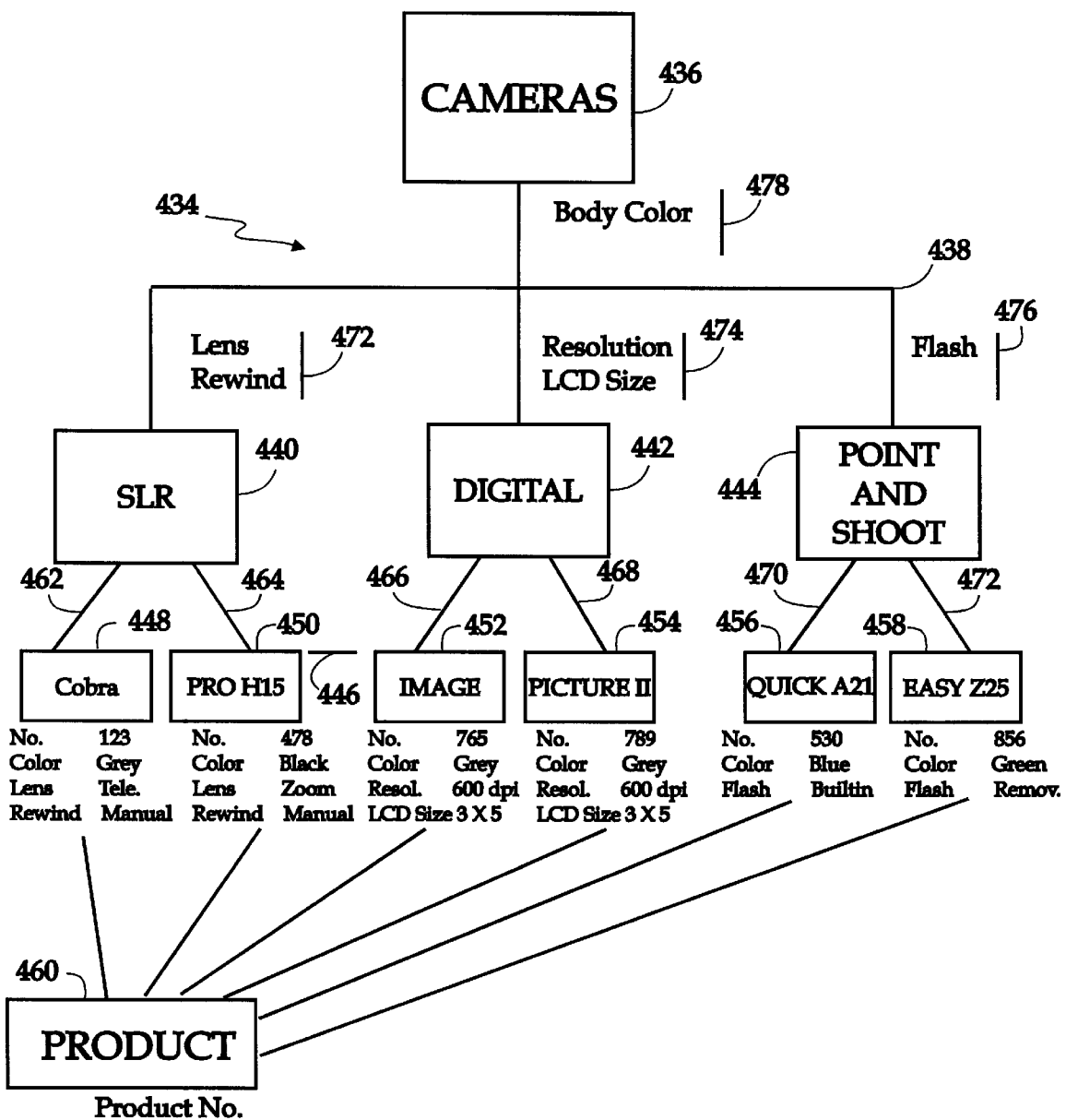
FIG. 19 is a block diagram illustrating the modifications to the frame-based, hierarchical organizational structure illustrated in FIG. 18, made in accordance with the method of the present invention in a second preferred form.

Continuing with reference to FIG. 20, once the "Is A" relationships have been established at step 506, the program embodying method 500 advances processing to step 510 where generic definitions for the product attributes are created and associated to the respective product frames. To accomplish this the program reads the product attributes having values for all the respective products in table 400, identifies them as generic attributes and associates them with the respective product frame at product level 446 of structure 434. Accordingly, in the illustration give, and as best seen in FIG. 19, since all products of table 400 include a value for the attributes Model Number (No.) and Body Color, all products frames would be assigned the attribute Model Number (No.) and Body Color and the respective attribute value for the products as shown.

Thereafter, once the generic attributes have been defined and associated, at step 510, the program would advance processing to step 512, in order to create and associate the specific attributes and attribute values contained in table 400 for the products with the respective product frames in structure 434. In this regard, only products attributes having values for the respective products would be associated with those products. Accordingly, as shown in FIG. 19, the Cobra and Pro H15 product frames would have the attributes Lens and Rewind associated with them along with the respective attribute value; while the Image and Picture II products, would have the attributes Resolution and LCD Size associated with them along with their respective values; and the Quick A21 and Easy Z25 products, the attributes Product Number, Body Color and Flash associated with them along with their respective values.

Following definition and assignment of the specific product frame attributes, the program as shown in FIG. 20 advances processing to step 514 at which the specific frame attributes are promoted into the frame hierarchy from the product frame level to finalize the hierarchical structure 434. To accomplish this, the method includes an iterative step 516 having branches 518 and 520. To promote frame attributes into the hierarchy, the program at step 514 goes to the lowest level in the hierarchy; i.e., the product frame level 446, identifies child frames of a common parent frame, and further, identifies attributes that are common to all such child frames. The program then advances the identified common child attributes to the parent frame; i.e., next highest frame to which they are associated in the next highest hierarchical level. Thereafter, processing advances from step 514 to 516 and commonality is again assessed to determine whether any other child frames exist having a common parent, and whether those child frames have common attributes which are subject to promotion. If child frames with common attribute exist, processing loops back from step 516 over path 518 to promotion step 514.

Subsequently, when all common attributes are promoted from child frames at product level 446, the process is again repeated at the next highest level in the hierarchy; e.g., subcategory level 438, and common child frame attributes promoted to their respective parent frame, until all promotion is exhausted. Finally, when all common frame attributes have been promoted to their highest level in the hierarchy, processing at step 516 exits at branch 520 to step 522.

With reference to FIG. 19, in the case of the current illustration, for the child product frames 448, 450, respectively, Cobra and Pro H15, the frame attributes Body Color, Lens and Rewind would first be promoted to parent frame 440, SLR at attribute gropup 472. Thereafter, for child frames 452, 454, Image and Picture, the attributes Body Color, Resolution and LCD Size would be promoted to frame 442, Digital at attribute group 474. And, following that, for child frames Quick A21 and Easy Z25, the attributes Body Color and Flash would be promoted to frame 444, Point & Shoot, at 476. Upon completion of attribute promotion to subcategory level 438, the promotion sequence would then continue, and the attribute, Body Color for child frames 440, 442 and 444, SLR, Digital and Point & Shoot, respectively, would be promoted to parent and highest frame 436, Camera. at 478. And, Upon completion of the promotion sequence, structure 434 would be finished and appear as shown in FIG. 19.

Subsequently, once specific frame attribute promotion is completed, processing would advance to Import step 522 and product records of table 400 loaded to completed frame-based, hierarchical structure 434. Thereafter, the program would complete by saving the resulting imported tabular data and automatically generated hierarchical structure as the user initially designated. The specified second preferred form of the a invention is implemented in a computer software program using the JAVA computer programming language. The tabular product data conforms to a generic relational format which is supported by the IBM Net.Commerce computer software product.

While this invention has been described in its various preferred forms, it will be appreciated that changes may be made in the form, procedure and sequences of its various steps without departing from its spirit or scope.

What we claim is:

1. A method for managing a computerized database having a frame-based hierarchical data organizational structure with the use of data having a tabular organizational structure, the method comprising the steps of:
   a. Providing a data organizational structure including two or more levels of hierarchical relationships, each level having one or more frames, each frame having one or more hierarchical attributes,
   b. Providing tabular data, the tabular data having an organizational structure including one or more rows and one or more columns which establish one or more data records having one or more record attributes, the tabular data being arranged in accordance with the respective records;
   c. Comparing the tabular data with the hierarchical data organizational structure;
   d. Modifying the hierarchical organizational structure to accommodate the tabular data based on the comparison of the tabular data with the hierarchical organizational structure; and
   e. Merging the tabular data into the organization structure as modified.

2. The method of claim 1 wherein comparing of tabular data with the hierarchical organizational structure and modifying the hierarchical organizational structure is interactively supervised by a user of the method.

3. The method of claim 2 wherein modifying the hierarchical organizational structure includes changing the hierarchical structure to accommodate tabular record attributes not found represented in the hierarchical attributes when the tabular data is compared with the hierarchical organizational structure.

4. The method of claim 3 wherein changing the hierarchical structure to accommodate tabular record attributes not found represented in the hierarchical attributes includes associating the not-found tabular record attributes with the highest level frame of the modified hierarchical structural to which the not-found tabular record attributes are common.

5. The method of claim 4 wherein modifying the hierarchical data structure includes changing the hierarchical data structure to accommodate hierarchical organizational structure suggested in the tabular data, but, not found in the hierarchical data organizational structure when the tabular data is compared with the hierarchical organizational structure.

6. The method of claim 5 wherein changing the hierarchical data structure to accommodate hierarchical organizational structure suggested in the tabular data includes adding frames to the hierarchical organizational structure based on suggestions for frames contained in the tabular data, but which are not found in the hierarchical data structure.

7. The method of claim 6 wherein the user of the method is an administrator of the hierarchical database.

8. The method of claim 6 wherein the user of the method manages a personal database.

9. The method of claim 6 wherein following modification of the hierarchical data organizational structure, the tabular record attributes are mapped to the hierarchical attributes of the modified hierarchical data organizational structure.

10. The method of claim 9 wherein following the mapping of the tabular record attributes to the hierarchical attributes of the modified hierarchical organizational structure, the mapping information is saved to a mapping specification which is stored for use in merging additional tabular data.

11. The method of claim 10 wherein following mapping of the tabular record attributes to the hierarchical attributes of the modified hierarchical organizational structure, the tabular records are mapped to the modified hierarchical organizational structure.

12. The method of claim 2 wherein comparing the tabular data includes analyzing the tabular data to identify hierarchical levels, frames and frame attributes suggested in the tabular data, and, modifying the hierarchical data structure includes originally creating the hierarchical organizational structure from levels, frames and attributes suggested in the tabular data.

13. The method of claim 12 wherein creating the hierarchical data organizational structure includes creating hierarchical frames and frame attributes to accommodate tabular record attributes represented in the tabular data and the hierarchical frame relationships suggested in the tabular data.

14. The method of claim 13 wherein creating the hierarchical structure includes creating the hierarchical data structure to accommodate hierarchical organizational structure suggested in the tabular data.

15. The method of claim 14 wherein creating the hierarchical organizational structure includes associating tabular record attributes with the highest frame of the created hierarchical structural to which the tabular record attributes are common.

16. The method of claims 1 wherein the tabular data includes record attribute information that defines the frame-based, hierarchical organizational structure.

17. The method of claim 16 wherein the tabular, record attribute information for defining the hierarchical data organizational structure includes category and subcategory information for the respective tabular records.

18. The method of claim 17 wherein the frame-based, hierarchical organization structure can be automatically generated from the tabular record attribute information so as to include resolution of frame names which avoid naming ambiguities in the hierarchical organizational structure.

19. The method of claim 18 wherein the levels of hierarchical relationship and the frames of the respective hierarchical levels are automatically generated from the tabular record attribute information, and wherein tabular record frames are provided at the lowest level of the hierarchical organizational structure.

20. The method of claim 19 wherein the hierarchical frame attributes are generated from the tabular record information by automatically promoting tabular record attribute information from the respective record frames to the highest common level of the hierarchical organizational structure.

* * * * *